(12) United States Patent
Sengupta et al.

(10) Patent No.: US 11,543,873 B2
(45) Date of Patent: Jan. 3, 2023

(54) WAKE-ON-TOUCH DISPLAY SCREEN DEVICES AND RELATED METHODS

(71) Applicant: Intel Corporation, Santa Clara, CA (US)

(72) Inventors: Uttam Sengupta, Portland, OR (US); Soethiha Soe, Beaverton, OR (US); Divyashree-Shivakumar Sreepathihalli, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/586,225

(22) Filed: Sep. 27, 2019

(65) Prior Publication Data
US 2020/0026342 A1  Jan. 23, 2020

(51) Int. Cl.
G06F 1/3231 (2019.01)
G06F 3/041 (2006.01)
G06F 3/02 (2006.01)

(52) U.S. Cl.
CPC .......... *G06F 1/3231* (2013.01); *G06F 3/0416* (2013.01); *G06F 3/02* (2013.01)

(58) Field of Classification Search
CPC .... G06F 3/0416; G06F 3/0304; G06F 1/3231; G06F 1/1616; G06F 1/3215; G06F 1/325
See application file for complete search history.

(56) References Cited

U.S. PATENT DOCUMENTS

| | | |
|---|---|---|
| 5,173,940 A | 12/1992 | Lantz et al. |
| 6,657,647 B1 | 12/2003 | Bright |
| 6,760,649 B2 | 7/2004 | Cohen |
| 7,386,799 B1 | 6/2008 | Clanton et al. |
| 7,559,034 B1 | 7/2009 | Paperny et al. |
| 7,725,547 B2 | 5/2010 | Albertson et al. |
| 7,971,156 B2 | 6/2011 | Albertson et al. |
| 8,139,032 B2 | 3/2012 | Su et al. |
| 8,566,696 B1 | 10/2013 | Hamon et al. |
| 8,717,318 B2 | 5/2014 | Anderson et al. |
| 8,812,831 B2 | 8/2014 | Cheng et al. |

(Continued)

FOREIGN PATENT DOCUMENTS

| | | |
|---|---|---|
| CN | 102197349 | 9/2011 |
| CN | 107077184 | 8/2017 |

(Continued)

OTHER PUBLICATIONS

Reads, "Microsoft Windows Vista SideShow—In-Depth (pics)", Notebook Review, Jan. 11, 2006, available at www.notebookreview.com/news/microsoft-windows-vista-sideshow-in-depth-pics/ (retrieved May 6, 2019), 7 pages.

(Continued)

*Primary Examiner* — Vincent H Tran
(74) *Attorney, Agent, or Firm* — Hanley, Flight & Zimmerman, LLC

(57) ABSTRACT

Wake-on-touch display screen devices and related methods are disclosed herein An example computing device includes a display screen, a first sensor to detect a presence of a user in an environment, a second sensor to detect a presence of an appendage of the user, and at least one processor to control a power state of the computing device based on first data generated by the first sensor and second data generated by the second sensor.

36 Claims, 5 Drawing Sheets

(56) References Cited

U.S. PATENT DOCUMENTS

| | | |
|---|---|---|
| 8,954,884 B1 | 2/2015 | Barger |
| 8,994,847 B2 | 3/2015 | Chen et al. |
| 9,268,434 B2 * | 2/2016 | Sultenfuss ............ G06F 1/3206 |
| 9,311,909 B2 | 4/2016 | Giaimo, III et al. |
| 9,436,241 B2 | 9/2016 | Tang et al. |
| 9,721,383 B1 | 8/2017 | Horowitz et al. |
| 9,740,290 B2 | 8/2017 | Rosenberg et al. |
| 9,785,234 B2 | 10/2017 | Horesh |
| 9,846,471 B1 | 12/2017 | Arora |
| 9,996,638 B1 | 6/2018 | Holz et al. |
| 10,027,662 B1 | 7/2018 | Mutagi et al. |
| 10,101,817 B2 | 10/2018 | Hsin et al. |
| 10,254,178 B2 | 4/2019 | Carbone et al. |
| 10,262,599 B2 | 4/2019 | Lang et al. |
| 10,415,286 B1 | 9/2019 | Porcella et al. |
| 10,551,888 B1 | 2/2020 | North et al. |
| 10,620,786 B2 | 4/2020 | Veeramani et al. |
| 10,725,510 B2 | 7/2020 | Ho et al. |
| 10,740,912 B2 | 8/2020 | Ren et al. |
| 10,819,920 B1 * | 10/2020 | Hamlin ................ G06F 1/1618 |
| 11,153,472 B2 | 10/2021 | Konicek |
| 11,194,398 B2 | 12/2021 | Bernhart |
| 11,360,528 B2 | 6/2022 | Mishra et al. |
| 11,379,016 B2 | 7/2022 | Cooper et al. |
| 2002/0089190 A1 | 7/2002 | Wang et al. |
| 2002/0091738 A1 | 7/2002 | Rohrabaugh et al. |
| 2003/0043174 A1 | 3/2003 | Hinckley et al. |
| 2003/0174149 A1 | 9/2003 | Fujisaki et al. |
| 2004/0158739 A1 | 8/2004 | Wakai et al. |
| 2004/0175020 A1 | 9/2004 | Bradski et al. |
| 2004/0252101 A1 | 12/2004 | Wilk |
| 2005/0071698 A1 | 3/2005 | Kangas |
| 2006/0146030 A1 | 7/2006 | Kim |
| 2006/0192775 A1 | 8/2006 | Nicholson et al. |
| 2007/0228138 A1 | 10/2007 | Huang et al. |
| 2008/0046425 A1 | 2/2008 | Perski |
| 2008/0112571 A1 | 5/2008 | Bradicich et al. |
| 2008/0158144 A1 | 7/2008 | Schobben et al. |
| 2008/0301300 A1 | 12/2008 | Toub |
| 2009/0092293 A1 | 4/2009 | Lin |
| 2009/0165125 A1 | 6/2009 | Brown et al. |
| 2010/0039376 A1 | 2/2010 | Wang |
| 2010/0281432 A1 | 11/2010 | Geisner et al. |
| 2011/0055752 A1 | 3/2011 | Rubinstein et al. |
| 2011/0154266 A1 | 6/2011 | Friend et al. |
| 2011/0175932 A1 | 7/2011 | Yu et al. |
| 2011/0248918 A1 | 10/2011 | Yoo et al. |
| 2011/0252339 A1 | 10/2011 | Lemonik et al. |
| 2011/0296163 A1 * | 12/2011 | Abernethy ............ G06F 1/3203 713/100 |
| 2011/0298702 A1 | 12/2011 | Sakata et al. |
| 2011/0298967 A1 | 12/2011 | Clavin et al. |
| 2012/0032894 A1 | 2/2012 | Parivar et al. |
| 2012/0054670 A1 | 3/2012 | Rainisto |
| 2012/0062470 A1 * | 3/2012 | Chang ................... G06F 1/3262 345/173 |
| 2012/0123680 A1 | 5/2012 | Wipplinger et al. |
| 2012/0171656 A1 | 7/2012 | Shen |
| 2012/0172085 A1 | 7/2012 | Vuppu et al. |
| 2012/0249429 A1 | 10/2012 | Anderson et al. |
| 2012/0300061 A1 | 11/2012 | Osman et al. |
| 2012/0319997 A1 | 12/2012 | Majumder |
| 2013/0007096 A1 | 1/2013 | Pahlavan et al. |
| 2013/0007590 A1 | 1/2013 | Rivera et al. |
| 2013/0021750 A1 | 1/2013 | Senatori |
| 2013/0120460 A1 | 5/2013 | Adams et al. |
| 2013/0158999 A1 | 6/2013 | Maruta et al. |
| 2013/0173946 A1 | 7/2013 | Rotem et al. |
| 2013/0174016 A1 | 7/2013 | Glazer et al. |
| 2013/0185633 A1 | 7/2013 | Bunker et al. |
| 2013/0207895 A1 | 8/2013 | Lee et al. |
| 2013/0212462 A1 | 8/2013 | Athas et al. |
| 2013/0222329 A1 | 8/2013 | Larsby et al. |
| 2013/0283213 A1 | 10/2013 | Guendelman et al. |
| 2013/0289792 A1 | 10/2013 | Cheng et al. |
| 2013/0321265 A1 | 12/2013 | Bychkov et al. |
| 2013/0321271 A1 | 12/2013 | Bychkov et al. |
| 2013/0332760 A1 | 12/2013 | Reece et al. |
| 2014/0006830 A1 * | 1/2014 | Kamhi .................. G06F 1/3206 713/324 |
| 2014/0028548 A1 | 1/2014 | Bychkov et al. |
| 2014/0085451 A1 | 3/2014 | Kamimura et al. |
| 2014/0089865 A1 | 3/2014 | Gay et al. |
| 2014/0129937 A1 | 5/2014 | Jarvinen et al. |
| 2014/0132508 A1 | 5/2014 | Hodge et al. |
| 2014/0139456 A1 | 5/2014 | Wigdor et al. |
| 2014/0149935 A1 | 5/2014 | Johnson et al. |
| 2014/0189579 A1 | 7/2014 | Rimon et al. |
| 2014/0191995 A1 * | 7/2014 | Karpin ................. G06F 3/0446 345/173 |
| 2014/0201690 A1 | 7/2014 | Holz |
| 2014/0208260 A1 | 7/2014 | Kawahara et al. |
| 2014/0258942 A1 | 9/2014 | Kutliroff et al. |
| 2014/0267021 A1 | 9/2014 | Lee et al. |
| 2014/0281918 A1 | 9/2014 | Wei et al. |
| 2014/0313120 A1 | 10/2014 | Kamhi |
| 2014/0361977 A1 | 12/2014 | Stafford et al. |
| 2014/0372511 A1 | 12/2014 | Kapadia et al. |
| 2014/0380075 A1 | 12/2014 | Pulapaka et al. |
| 2015/0009238 A1 | 1/2015 | Kudalkar |
| 2015/0015688 A1 | 1/2015 | Yang |
| 2015/0100884 A1 | 4/2015 | Ryu et al. |
| 2015/0121193 A1 | 4/2015 | Beveridge et al. |
| 2015/0121287 A1 | 4/2015 | Fermon |
| 2015/0177843 A1 | 6/2015 | Kwon |
| 2015/0185909 A1 * | 7/2015 | Gecnuk ................. G06F 1/324 345/174 |
| 2015/0193395 A1 | 7/2015 | Nicolaou et al. |
| 2015/0220149 A1 | 8/2015 | Plagemann et al. |
| 2015/0220150 A1 | 8/2015 | Plagemann et al. |
| 2015/0248167 A1 | 9/2015 | Turbell et al. |
| 2015/0264572 A1 | 9/2015 | Turgeman |
| 2015/0360567 A1 | 12/2015 | Sannomiya et al. |
| 2015/0363070 A1 | 12/2015 | Katz |
| 2016/0034019 A1 | 2/2016 | Seo et al. |
| 2016/0062584 A1 | 3/2016 | Cohen et al. |
| 2016/0087981 A1 | 3/2016 | Dorresteijn |
| 2016/0091938 A1 | 3/2016 | Edwards et al. |
| 2016/0109961 A1 | 4/2016 | Parshionikar |
| 2016/0116960 A1 * | 4/2016 | Kwak ................... G06F 1/3206 713/323 |
| 2016/0132099 A1 | 5/2016 | Grabau et al. |
| 2016/0170617 A1 | 6/2016 | Shi et al. |
| 2016/0179767 A1 | 6/2016 | Mavinakuli et al. |
| 2016/0180762 A1 | 6/2016 | Bathiche et al. |
| 2016/0187994 A1 | 6/2016 | La et al. |
| 2016/0202750 A1 | 7/2016 | Pulapaka et al. |
| 2016/0212317 A1 | 7/2016 | Alameh et al. |
| 2016/0232701 A1 | 8/2016 | Drozdyuk |
| 2016/0259467 A1 * | 9/2016 | Nayyar ................. G06F 1/3262 |
| 2016/0297362 A1 | 10/2016 | Tijerina et al. |
| 2016/0370860 A1 | 12/2016 | Bychkov et al. |
| 2017/0034146 A1 | 2/2017 | Sugaya |
| 2017/0039170 A1 | 2/2017 | Tunali et al. |
| 2017/0085790 A1 | 3/2017 | Bohn |
| 2017/0090585 A1 | 3/2017 | Bernhart |
| 2017/0147879 A1 | 5/2017 | Alameh et al. |
| 2017/0201254 A1 * | 7/2017 | Hanssen ............ G01R 27/2605 |
| 2017/0219240 A1 | 8/2017 | Cassini et al. |
| 2017/0269725 A1 * | 9/2017 | Kang ................... G06F 1/3218 |
| 2017/0321856 A1 | 11/2017 | Keates |
| 2018/0039410 A1 | 2/2018 | Kim et al. |
| 2018/0039990 A1 | 2/2018 | Lindemann |
| 2018/0136719 A1 | 5/2018 | Chen |
| 2018/0157815 A1 | 6/2018 | Salama et al. |
| 2018/0164942 A1 * | 6/2018 | Huffman ............... G06F 3/0416 |
| 2018/0166076 A1 | 6/2018 | Higuchi et al. |
| 2018/0188774 A1 | 7/2018 | Ent et al. |
| 2018/0189547 A1 | 7/2018 | Daniels et al. |
| 2018/0224871 A1 | 8/2018 | Sahu et al. |
| 2018/0321731 A1 * | 11/2018 | Alfano ................. G06F 1/3265 |
| 2019/0004764 A1 | 1/2019 | Son et al. |
| 2019/0034609 A1 * | 1/2019 | Yang ........................ G10L 17/00 |
| 2019/0079572 A1 * | 3/2019 | Yamamoto ............ G06F 3/045 |

(56) References Cited

U.S. PATENT DOCUMENTS

| | | | |
|---|---|---|---|
| 2019/0147875 A1 | 5/2019 | Stemmer et al. | |
| 2019/0174419 A1* | 6/2019 | Schillings | H04W 52/0254 |
| 2019/0239384 A1 | 8/2019 | North et al. | |
| 2019/0250691 A1 | 8/2019 | Lee et al. | |
| 2019/0258785 A1 | 8/2019 | Alameh et al. | |
| 2019/0265831 A1* | 8/2019 | Sinnott | G06F 3/0416 |
| 2019/0278339 A1 | 9/2019 | Cooper et al. | |
| 2019/0361501 A1 | 11/2019 | Park et al. | |
| 2019/0371326 A1 | 12/2019 | Bocklet et al. | |
| 2019/0371342 A1 | 12/2019 | Tukka et al. | |
| 2020/0012331 A1* | 1/2020 | de Cesare | G06F 3/005 |
| 2020/0033920 A1 | 1/2020 | Nielsen et al. | |
| 2020/0125158 A1* | 4/2020 | Giusti | G01S 7/35 |
| 2020/0133358 A1 | 4/2020 | Mishra et al. | |
| 2020/0133374 A1 | 4/2020 | Sinha et al. | |
| 2020/0134151 A1 | 4/2020 | Magi et al. | |
| 2020/0175944 A1 | 6/2020 | Sun et al. | |
| 2020/0213501 A1 | 7/2020 | Sohn | |
| 2020/0259638 A1 | 8/2020 | Carmignani et al. | |
| 2020/0348745 A1* | 11/2020 | Hamlin | G06F 3/017 |
| 2021/0025976 A1 | 1/2021 | Chandel et al. | |
| 2021/0109585 A1 | 4/2021 | Fleming et al. | |
| 2021/0240254 A1 | 8/2021 | Hamlin et al. | |
| 2021/0318743 A1 | 10/2021 | Partiwala et al. | |
| 2022/0147142 A1 | 5/2022 | Bui et al. | |

FOREIGN PATENT DOCUMENTS

| | | |
|---|---|---|
| EP | 2518586 | 10/2012 |
| EP | 3285133 B1 | 1/2019 |
| KR | 20150022673 | 3/2015 |
| KR | 20180029370 A | 3/2018 |
| WO | 2010071631 | 6/2010 |
| WO | 2014131188 | 9/2014 |
| WO | 2014186294 | 11/2014 |
| WO | 2014205227 A2 | 12/2014 |
| WO | 2015026203 | 2/2015 |
| WO | 2020191643 A1 | 10/2020 |
| WO | 2021258395 | 12/2021 |

OTHER PUBLICATIONS

NVIDIA, "NVIDIA® Preface™ Platform Enables Windows Vista On The Go," Jan. 8, 2007, available at https://www.nvidia.com/object/IO_38775.html (retrieved May 6, 2019), 5 pages.

NVIDIA, "NVIDIA and ASUS Deliver World's First Notebook with Windows Sideshow Secondary Display," Jan. 8, 2007, available at https://www.nvidia.com/object/IO_38772.html (retrieved May 6, 2019), 5 pages.

"CES 2007: Vista SideShow in HP, Fujitsu, LG and Asus Notebooks," Notebook Review, Jan. 8, 2007, available at www.notebookreview.com/news/ces-2007-vista-sideshow-in-hp-fujitsu-lg-and-asus-notebooks/ (retrieved May 6, 2019), 8 pages.

NVIDIA, "PDK User's Guide: Preface Personal Media Device," Sep. 4, 2007, 39 pages.

"Open Sesame! Gesture-Controlled Motorized Laptop Lid", Gajitz, available at https://gajitz.com/open-sesame-gesture-controlled-motorized-laptop-lid/ (last accessed May 6, 2019), 3 pages.

Purcher, ""Google Patents a Motorized Pixelbook Lid that Opens and Closes with a Simple Touch & Auto-Aligns the Display to the user's Face"", Patently Mobile, Nov. 25, 2017, available at https://www.patentlymobile.com/2017/11/google-patents-a-motorized-pixelbook-lid-that-opens-and-closes-with-a-simple-touch-auto-aligns-the-display-to-the-users-fa.html (retrieved May 5, 2019), 6 pages.

"Cosmo Communicator", Indiegogo, available at https://www.indiegogo.com/projects/cosmo-communicator#/ (last accessed May 6, 2019), 18 pages.

Cutress, "Asus ZenBook Pro 15(UX580): A 5.5-inch Screen in the Touchpad", AnandTech, Jun. 5, 2018, available at https://www.anandtech.com/show/12880/asus-zenbook-pro-15-ux580-a-55inch-screen-in-the-touchpad (retrieved Dec. 18, 2018), 5 pages.

Chin, "Alexa on Windows 10 Hands-On: Useful, with 1 Big Catch", Laptop Magazine, Nov. 14, 2018, available at https://www.laptopmag.com/articles/alexa-windows-10-hands-on (retrieved May 6, 2019), 6 pages.

Bushan, "CES 2019: Dell's new laptop can sense your presence and wake itself," Hindustan Times, Jan. 5, 2019, available at https://www.hindustantimes.com/tech/ces-2019-dell-latitude-7400-2-in-1-laptop-launched-price-specifications-features/story-CiRoU1GoHHsHq3K3qtPZWJ.html (retrieved May 6, 2019), 8 pages.

International Searching Authority, "Written Opinion," issued in connection with International Patent Application No. PCT/CN2019/079790, dated Jan. 3, 2020, 4 pages.

International Searching Authority, "Search Report," issued in connection with International Patent Application No. PCT/CN2019/079790, dated Jan. 3, 2020, 5 pages.

European Patent Office, "Extended European Search Report," issued in connection with European Patent Application No. 20164273.3, dated Oct. 19, 2020, 14 pages.

United States Patent and Trademark Office, "Notice of Allowance," issued in connection with U.S. Appl. No. 29/673,785, dated Nov. 16, 2020, 8 pages.

European Patent Office, "Extended Search Report," issued in connection with European Patent Application No. 20181123.9, dated Dec. 4, 2020, 11 pages.

"Dell's New Latitude 7400 2-in-1 Can Detect Your Presence and Automatically Wake the System," MSPowerUser, Jan. 4, 2019, available at https://mspoweruser.com/dells-new-latitude-7400-2-in-1-can-detect-your-presence-and-automatically-wake-the-system/ (20 pages).

United States Patent and Trademark Office, "Advisory Action" issued in connection with U.S. Appl. No. 14/866,894, dated Nov. 5, 2019, 3 pages.

United States Patent and Trademark Office, "Final Office Action" issued in connection with U.S. Appl. No. 14/866,894, dated Jul. 29, 2019, 18 pages.

United States Patent and Trademark Office, "Final Office Action" issued in connection with U.S. Appl. No. 14/866,894, dated Jun. 23, 2020, 17 pages.

United States Patent and Trademark Office, "Non Final Office Action" issued in connection with U.S. Appl. No. 14/866,894, dated Feb. 21, 2020, 17 pages.

United States Patent and Trademark Office, "Non Final Office Action" issued in connection with U.S. Appl. No. 14/866,894, dated Oct. 8, 2020, 18 pages.

United States Patent and Trademark Office, "Non-Final Office Action" issued in connection with U.S. Appl. No. 14/866,894, dated Dec. 14, 2018, 12 pages.

European Patent Office, "Extended European Search Report," issued in connection with European Patent Application No. 20197337.7, dated Mar. 9, 2021, 11 pages.

European Patent Office, "Rule 62a(1) Communication," issued in connection with European Patent Application No. 20197335.1, dated Mar. 17, 2021, 2 pages.

United States Patent and Trademark Office, "Final Office Action," issued in connection with U.S. Appl. No. 14/866,894, dated May 11, 2021, 17 pages.

European Patent Office, "Extended European Search Report" issued in connection with European Patent Application No. 20194494.9, dated Feb. 17, 2021, 7 pages.

International Searching Authority, "International Search Report," issued in connection with PCT Application No. PCT/US2016/048953, dated Nov. 23, 2016, 3 pages.

International Searching Authority, "Written Opinion of the International Searching Authority ," issued in connection with PCT Application No. PCT/US2016/048953, dated Nov. 23, 2016, 9 pages.

United States Patent and Trademark Office, "Non-Final Office Action," issued in connection with U.S. Appl. No. 16/728,774, dated May 3, 2021, 12 pages.

European Patent Office, "Extended European Search Report" issued in connection with European Patent Application No. 20197335.1, dated Jul. 16, 2021, 11 pages.

(56) References Cited

OTHER PUBLICATIONS

International Searching Authority, "International Preliminary Report on Patentability," issued in connection with PCT/US2016/048953, dated Mar. 27, 2018, 10 pages.

International Searching Authority, "Search Report and Written Opinion ," issued in connection with PCT Application No. PCT/CN2020/098326, dated Mar. 29, 2021, 9 pages.

United States Patent and Trademark Office, "Notice of Allowance and Fee(s) Due," issued in connection with U.S. Appl. No. 14/866,894, dated Jul. 30, 2021, 8 pages.

United States Patent and Trademark Office, "Final Office Action," issued in connection with U.S. Appl. No. 16/728,774, dated Sep. 22, 2021, 20 pages.

United States Patent and Trademark Office, "Non-Final Office Action," issued in connection with U.S. Appl. No. 16/421,217, dated Oct. 27, 2021, 29 pages.

European Patent Office, "Communication pursuant to Article 94(3) EPC," issued in connection with European Patent Application No. 20164273.3, dated Sep. 28, 2021 9 pages.

United States Patent and Trademark Office, "Non-Final Office Action" issued in connection with U.S. Appl. No. 16/728,899, dated Dec. 8, 2021, 9 pages.

United States Patent and Trademark Office, "Notice of Allowance and Fee(s) Due," issued in connection with U.S. Appl. No. 16/728,774, dated Feb. 2, 2022, 9 pages.

Ravotta, Nicholas, "Optimizing Proximity Sensing for Consumer Electronics Applications," Digi-Key Electronics, Apr. 26, 2012, 9 pages.

Chethan, "Proximity Sensing with CapSense," Cypress AN92239, 2016, 62 pages.

United States Patent and Trademark Office, "Notice of Allowance and Fee(s) Due" issued in connection ith U.S. Appl. No. 16/421,217, dated Mar. 9, 2022, 6 pages.

United States Patent and Trademark Office, "Non-Final Office Action," issued in connection with U.S. Appl. No. 16/725,467, dated Apr. 7, 2022, 19 pages.

United States Patent and Trademark Office, "Non-Final Office Action," issued in connection with U.S. Appl. No. 17/434,603, dated Jul. 5, 2022, 15 pages.

United States Patent and Trademark Office, "Final Office Action," issued in connection with U.S. Appl. No. 16/728,899, dated Jun. 24, 2022, 10 pages.

International Searching Authority, "International Search Report", issued in connection with PCT. Application No. PCT/US2021/049649, dated Jan. 14, 2022, 5 pages.

International Searching Authority, "Written Opinion", issued in conenction with PCT. Application No. PCT/US2021/049649, dated Jan. 14, 2022, 9 pages.

United States Patent and Trademark Office, "Advisory Action" issued in connection with U.S. Appl. No. 14/866,894, dated Aug. 17, 2020, 3 pages.

United States Patent and Trademark Office, "Final Office Action," issued in connection with U.S. Appl. No. 16/725,467, dated Aug. 18, 2022, 29 pages.

United States Patent and Trademark Office, "Non-Final Office Action" issued in connection with U.S. Appl. No. 16/728,899, dated Oct. 20, 2022, 9 pages.

European Patent Office, "Extended European Search Report," issued in connection with European Patent Application No. 19921860.3, dated Oct. 10, 2022, 8 pages.

\* cited by examiner

WAKE-ON-TOUCH DISPLAY SCREEN DEVICES AND RELATED METHODS

FIELD OF THE DISCLOSURE

This disclosure relates generally to touch screen devices, and, more particularly, to wake-on-touch display screen devices and related methods.

BACKGROUND

A user device, such as a laptop or a tablet, can enter a low power state or standby mode when the device is powered on but has not received a user input for an extended period of time. An action by the user such as pressing a key on a keyboard, moving an input device such as a mouse or touch pad, or touching a touch-enabled display screen of the device can prompt the device to wake and move from the low power state to a working operational state.

BRIEF DESCRIPTION OF THE DRAWINGS

The figures are not to scale. In general, the same reference numbers will be used throughout the drawing(s) and accompanying written description to refer to the same or like parts.

Figure 1:
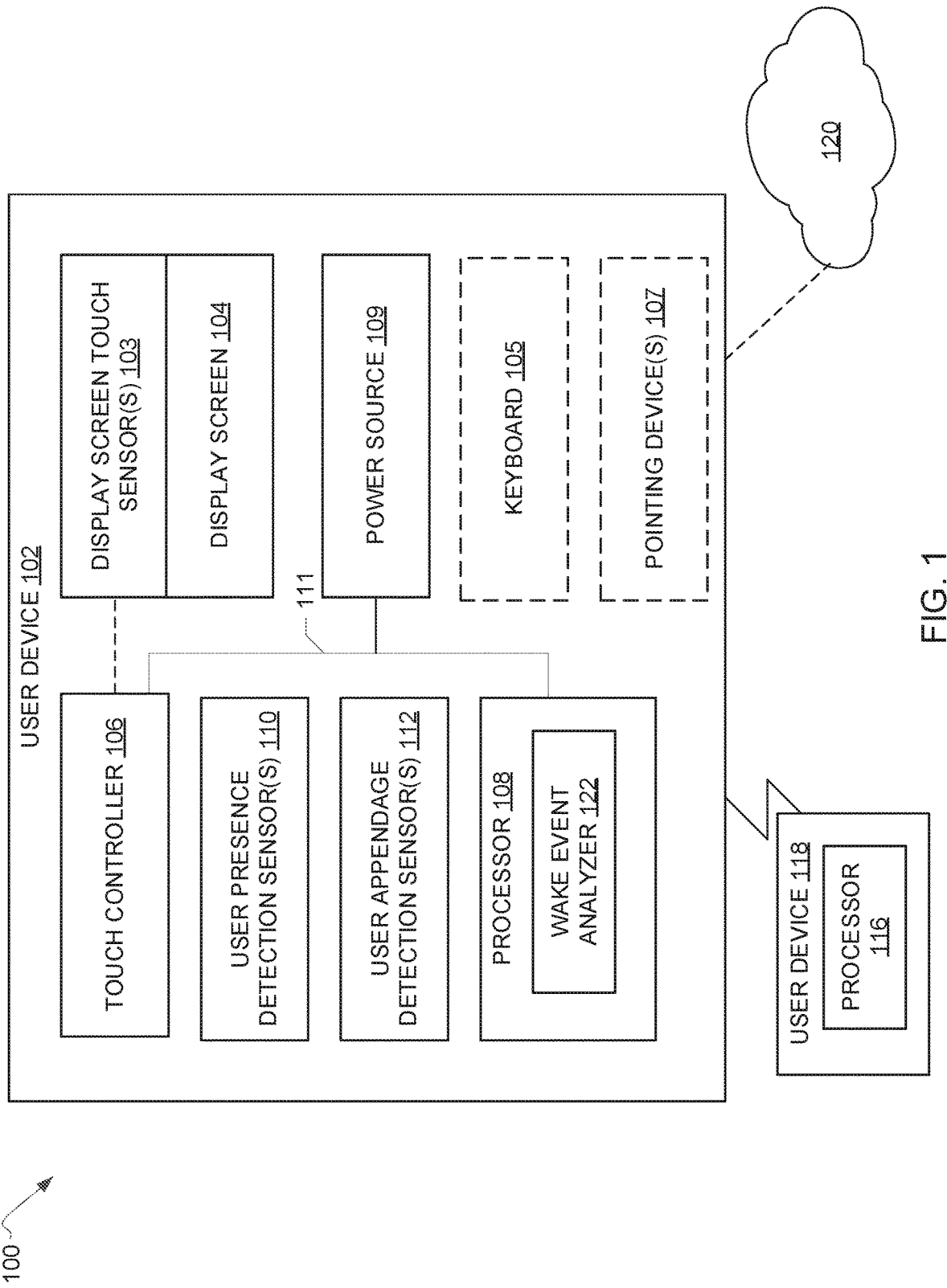
FIG. 1 illustrates an example system constructed in accordance with teachings of this disclosure and including an example user device and an example wake event analyzer for controlling an operational mode of the user device.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

An electronic user device such as a laptop, a tablet, etc. can transition between different system power states. When the user device is in use by the user, the device is in the working system power state, also known as an S0 system power state. The user device is fully operational in the S0 system power state in that the display screen is turned on, applications are being executed by processor(s) of the device, etc. The user device consumes the highest amount of power in the S0 system power state.

The user device can enter a lower power state when the device is powered on but has not received a user input for an extended period of time in an effort to reduce power consumption when the device is not being actively used by a user. Some user devices transition to a connected standby mode, also referred to as an S0 low-power idle state, after a period of time in which no user inputs are received at the device. In the connected standby mode, the display screen of the device is turned off, certain components of the user device may be partly or completely powered down, and/or certain applications may not be executed by processor(s) of the device. However, the device remains connected to the Internet via one or more wired or wireless connection(s) such that processor(s) of the device can respond quickly to hardware and/or network events. For instance, in the connected standby mode, an email application downloads emails, rather than waiting to refresh emails when the device returns to the working system power state (S0). Devices that support the connected standby mode are also quickly able to return to the working system power state (S0) based on a user input such as pressing a key on a keyboard, moving a mouse, dragging a finger across a touch pad or isopoint device, and/or touching a touch-enabled screen of the device. In response to such a wake event, the display screen is turned on to present content and enable the user to interact with the device. The system power states for the user device are summarized in Table 1, below.

TABLE 1

| System Power States | |
|---|---|
| System Power State | Example System Power State Properties |
| S0 (Working System Power State) | High power state. E.g., display screen is turned on, applications are being executed by processor(s) of the device. |
| S0 Low-Power Idle State (Connected Standby Mode) | Low power standby state. E.g., display screen is turned off, certain applications may not be executed by processor(s) of the device. The device remains connected to the Internet. |

A hardware device of the personal computing device, such as a display controller, can transition between different device power states when the user device in one of the system power states (e.g., the S0 working system power state, the S0 low-power idle state). For instance, when the device is in the S0 working system power state, the hardware device may be fully powered and operational and, thus, in D0 working device power state. In some examples, the hardware device is instructed to move from the D0 working device power state to a low power state if the hardware device is not in use when the device is in the S0 working system power state to reduce power consumption. In other examples, the hardware device is moved to the low power state when the device enters the connected standby mode (i.e., S0 low-power idle state). The low power state for the user device can be a D3 power state, which includes two sub-states, D3 Hot State and D3 Cold State, as described in Table 2, below. As shown in Table 2, the hardware device can transition between the high power D0 working device power state and the low power D3 hot state or D3 cold state while in the working system power state (S0) or the connected standby mode (S0 low-power idle state).

TABLE 2

Device Power States

| Device Power State | Example Device Power State Properties | Available System Power States |
|---|---|---|
| D0 | High power, working device power state. The hardware device is fully powered. | S0<br>S0 low-power idle state |
| D3 Hot State | Low power device power state. The hardware device is connected to a power source and can be detected by a bus of the system. | S0<br>S0 low-power idle state |
| D3 Cold State | Low power device power state. The hardware device is physically connected to the bus, but the bus state cannot detect a presence of the hardware device because either the bus is in a low power state and/or because the hardware device does not respond when the bus attempts to detect the presence of the hardware device on the bus. | S0<br>S0 low-power idle |

Some known touch screen user devices include a touch controller that scans a touch screen panel for changes in capacitance indicative of a touch event while the device is in the connected standby mode (S0 low-power idle state). However, maintaining the touch controller in the full power, D0 working device power state while the user device is in the connected standby mode can result in high power consumption while the user device is not in use, thereby preventing the user device from achieving a low power consumption target while in the connected standby mode.

Some known user devices automatically wake from the connected standby mode when presence of a user is detected within a vicinity of the user device. For instance, some known devices include a proximity sensor that detects the presence of a user within a range of the sensor. Based on the detection of the user's presence, such known devices automatically wake from the connected standby mode. However, reliance on the user's presence within a proximity range of a sensor can result in false positives. For instance, a dog walking by a laptop including the proximity sensor may trigger the device to wake based on the detection of the dog by the proximity sensor, thereby inadvertently causing the device to consume power without any user intent to use the device. Some other known user devices include a camera to capture image data of the surrounding environment and detect user presence based on the image data (e.g., facial recognition). However, the use of a camera to capture image data may increase power consumption by the user device when the user device is not in use.

Disclosed herein are example touch screen user devices that provide for a low power, wake-on-touch activation of the user device from a connected standby mode. Examples disclosed herein use a multi-level process to wake the user device from the connected standby mode based on a determination of user intent to resume use of the device. Example user devices disclosed herein include proximity sensor(s) to detect (1) when a user is present relative to the user device and (2) when an appendage of the user (e.g., an arm, a hand, finger(s)) is proximate to the user device (e.g., moving toward the a display screen of the user device). In examples disclosed herein, the sensor(s) that detect the user's appendage can be at, for instance, a keyboard of the device such that user's appendage is detected within the range of the sensor(s) as the user reaches for the display screen of the user device. Based on the sensor data indicating user activity relative to the device, examples disclosed herein transition a touch controller of the user device from a low-power device power state (e.g., D3 cold state) to a higher power device power state (e.g., D3 hot state, D0 working device power state) in anticipation of a touch event on the display screen. When a wake event is detected at a user input device of the personal computing device (e.g., a touch on the display screen, the pressing of a key of a keyboard, movement of the mouse or touch pad), examples disclosed herein instruct the user device to move from the connected standby mode (S0 low-power idle state) to the working system power state (S0).

Examples disclosed herein maintain the user device in the connected standby mode (S0 low-power idle state) until user intent to use the device is verified. Rather than instructing the device to transition to the working system power state (S0) based on the detection of user presence alone, examples disclosed herein additionally monitor for the presence of appendage(s) of the user proximate to the user device (e.g., over a keyboard, toward the display screen) to confirm that the user intends to use the device before waking the device. If the sensor(s) do not detect the appendage(s) of the user within a threshold period of time of the detection of the presence of the user near the device, examples disclosed herein maintain the user device in the connected standby mode. As a result, examples disclosed herein prevent instances in which the user device is wakened from the connected standby mode and transitioned to the working system power state based on presence of a subject in the vicinity of the device alone, only to have the device return to the connected standby mode when no user input is received. Examples disclosed herein also prevent instances in which the user device is wakened from the connected standby mode and transitioned to the working power state based on presence of a subject in the vicinity of the device alone, only to have the device return to the connected standby mode when the device is not able to authenticate the user via, for instance, facial recognition scanning (e.g., because the user is not near the display screen of the device and/or because the sensor(s) actually detected the presence of another subject or a pet). Further, examples disclosed herein transition the device powers state of the touch controller from the low power, D3 cold state to the D0 working device power state in stages as the user intent to touch the display screen is verified using the sensor data indicative of the position of the user's appendage(s) (e.g., from D3 cold state to D3 hot state, from D3 hot state to D0 working device power state). Examples disclosed herein provide for low latency wake of the touch controller based on increasing confidence of the occurrence of a touch event at the display screen by progressively increasing the device power state of the touch controller as different levels of user activity relative to the user device are detected (e.g., user presence detection, appendage detection, etc.).

Although examples disclosed herein are discussed in connection with the connected standby mode (S0 low-power idle state), examples disclosed herein can be implemented in connection with other known standby/sleep power states or future standby/sleep power states providing for always-on internet protocol functionality.

FIG. 1 illustrates an example system 100 constructed in accordance with teachings of this disclosure for controlling an operational mode of a user device 102. The user device 102 can be, for example, a personal computing (PC) device such as a laptop, a desktop, an all-in-one PC, a hybrid or convertible PC, an electronic tablet, etc.

The example user device 102 includes a display screen 104. In the example of FIG. 1, the display screen 104 is a touch screen that enables a user to interact with data presented on the display screen 104 by touching the screen with a stylus and/or one or more fingers of a hand of the user (the terms "user" and "subject" are used interchangeably herein and both refer to a biological (e.g., carbon-based) creature such as a human being). The example display screen 104 includes one or more display screen touch sensor(s) 103 that detect electrical changes (e.g., changes in capacitance, changes in resistance) when the user touches the display screen. In some examples, the display screen is a capacitive display screen. In such examples, the display screen touch sensors 103 include sense lines that intersect with drive lines carrying current. The sense lines transmit signal data when a change in voltage is detected at locations where the sense lines intersect with drive lines when the user touches the display screen 104. In other examples, the display screen 104 is a resistive touch screen and the display screen touch sensor(s) 103 include sensors that detect changes in voltage when conductive layers of the resistive display screen 104 are pressed together in response pressure on the display screen from the user's touch.

In some examples, the user device 102 includes a keyboard 105. In other examples, such as when the user device 102 is an electronic tablet, a keyboard is presented via the display screen 104 and the user provides inputs on the keyboard by touching the display screen 104. In some examples, the user device 102 includes one or more pointing devices 107 such as mouse and/or a touch pad.

The example user device 102 include a touch controller 106 to process the signal data generated by the display screen touch sensor(s) 103 when the user touches the display screen 104. The touch controller 106 interprets the signal data to detect touch event(s) at particular locations on the display screen 104 (e.g., where voltage change(s) were detected by the sense line(s) in a capacitive touch screen). The touch controller 106 communicates the touch event(s) to, for example, a processor 108 of the user device 102. The processor 108 executes software to interpret and output response(s) based on the touch event(s). The user device 102 of FIG. 1 includes a power source 109 such as a battery to provide power to the processor 108 and/or other components of the user device 102.

In the example of FIG. 1, when the user interacts with the user device 102 and the processor 108 receives user input(s) via touch event(s) at the display screen 104, via the keyboard 105, and/or via the pointing device(s) 107, the user device 102 is placed in the working system power state (S0). In such instances, hardware devices of the user device 102, such as the touch controller 106, may be in the D0 working device power state (e.g., a fully powered state). Also, the display screen 104 is turned on. In some examples, one or more other hardware devices of the user device 102 that are not in use may be in a lower power device power state (e.g., D3 hot state, D3 cold state).

In the example of FIG. 1, the processor 108 can instruct the user device 102 to move from the working system power state (S0) in which the device is fully operational to a connected standby mode (S0 low-power idle state) after a threshold period of time without receiving any user inputs at the user device 102 (e.g., five minutes, ten minutes). When the example user device 102 of FIG. 1 is in the connected standby mode. the display screen 104 is turned off and one or more applications running on the user device 102 are suspended, but the user device 102 remains connected to the Internet via one or more wired or wireless connection(s). In the connected standby mode, the example user device 102 can be quickly transitioned to return to the fully operational or working system power state (S0) when the user selects a key on the keyboard 105 of the user device 102, moves the pointing device(s) 107, and/or touches the display screen 104.

In the example of FIG. 1, when the user device 102 is in the connected standby mode (S0 low-power idle state), the hardware device(s) of the user device, such as the touch controller 106 are in a low-power device power state. For example, when the user device 102 is in the connected standby mode, the processor 108 instructs the touch controller 106 to enter the D3 cold state, or a device power state in which a presence of the touch controller 106 is not detected by a bus 111 of the user (e.g., because the touch controller 106 does not respond in response to an attempt to detect the presence of the touch controller 106 on the bus 111). The touch controller 106 can transition from the D3 cold state to the working device power state (D0) when the processor 108 instructs the touch controller 106 to wake in response to a wake event, such as the pressing of a key on the keyboard 105.

The example user device 102 of FIG. 1 includes one or more user presence detection sensors 110 that provide means for detecting a presence of a user relative to the user device 102 in an environment in which the user device 102 is located, such as a user who is approaching the user device 102. The example user device 102 includes one or more user appendage detection sensors 112 that provide means for detecting an appendage of the user (e.g., an arm, hand, finger(s)) relative to the user device 102. As disclosed herein, based on the data generated by the sensors 110, 112, a user intent to resume use of the user device 102 is inferred and serves as basis to wake the user device 102.

In the example of FIG. 1, the user presence detection sensor(s) 110 include proximity sensor(s) that emit electromagnetic radiation (e.g., light pulses) and detect changes in the signal due to the presence of a person or object (e.g., based on reflection of the electromagnetic radiation (e.g., light pulses)). In some examples, the user presence detection sensor(s) 110 include time-of-flight sensor(s) that measure a length of time for light to return to the sensor after being reflected off a person or object, which can be used to determine depth. The example user presence detection sensor(s) 110 can include other types of depth sensors, such as sensors that detect changes based on radar or sonar data.

The user presence detection sensor(s) 110 are carried by the example user device 102 such that the user presence detection sensor(s) 110 can detect changes in an environment in which the user device 102 is located that occur with a range (e.g., a distance range) of the user presence detection sensor(s) 110 (e.g., within 10 feet of the user presence detection sensor(s) 110, within 5 feet, etc.). For example, the user presence detection sensor(s) 110 can be mounted on a bezel of the display screen 104 and oriented such that the user presence detection sensor(s) 110 can detect a user approaching the user device 102. The user presence detection sensor(s) 110 can additionally or alternatively be at any other locations on the user device 102 where the sensor(s) 110 face an environment in which the user device 102 is located, such as on a base of the laptop (e.g., on an edge of the base in front of a keyboard carried by base), a lid of the laptop, on a base of supporting the display screen 104 in examples where the display screen 104 is a monitor of a desktop or all-in-one PC, etc.

In the example of FIG. 1, the user appendage detection sensor(s) 112 include proximity sensor(s) such as time-offlight sensor(s). In the example of FIG. 1, the user appendage detection sensor(s) 112 are mounted at locations on the user device 102 where the user's arm, hand, and/or finger(s) are likely to move or pass over as the user brings his or her arm, hand, and/or finger(s) toward the display screen 104, the keyboard 105, and/or other user input device (e.g., the pointing device(s) 107). The user appendage detection sensor(s) 112 can be at, for instance, one or more locations on the keyboard 105 of the user device 102, at a hinge of the user device 102 in examples where the user device 102 is a laptop, etc. The range of the user appendage detection sensor(s) 112 can be, for instance, 1 foot, 1 centimeter, 3 millimeters, etc. In some examples, the range of the user appendage detection sensor(s) 112 is tuned based on the location of the sensor(s) (e.g., sensor(s) at the hinge of a laptop may have a longer range than the sensor(s) on the keyboard). In some examples, the range of the user appendage detection sensor(s) 112 is less than the range of the user presence detection sensor(s) 110 for increased sensitivity in detecting the presence of the user's appendage(s) relative to the user input device(s) (e.g., the display screen 104, the keyboard 105).

The example system 100 of FIG. 1 includes one or more semiconductor-based processors to process sensor data generated by the user presence detection sensor(s) 110 and/or the user appendage detection sensor(s) 112. For example, the sensor(s) 110, 112 can transmit data to the on-board processor 108 of the user device 102. In other examples, the sensor(s) 110, 112 can transmit data to a processor 116 of another user device 118, such as a smartphone or a wearable device such as a smartwatch. In other examples, the sensor(s) 110, 112 can transmit data to a cloud-based device 120 (e.g., one or more server(s), processor(s), and/or virtual machine(s)).

In some examples, the processor 108 of the user device 102 is communicatively coupled to one or more other processors. In such an example, the sensor(s) 110, 112 can transmit the sensor data to the on-board processor 108 of the user device 102. The on-board processor 108 of the user device 102 can then transmit the sensor data to the processor 116 of the user device 118 and/or the cloud-based device(s) 120. In some such examples, the user device 102 (e.g., the sensor(s) 110, 112 and/or the on-board processor 108) and the processor(s) 116, 120 are communicatively coupled via one or more wired connections (e.g., a cable) or wireless connections (e.g., cellular, Wi-Fi, or Bluetooth connections). In other examples, the sensor data may only be processed by the on-board processor 108 (i.e., not sent off the device).

In the example system 100 of FIG. 1, the sensor data generated by the user presence detection sensor(s) 110, the user appendage detection sensor(s) 112, and/or the display screen touch sensor(s) 103 is processed by a wake event analyzer 122 to control the transition of the user device 102 from the connected standby mode (S0 low-power idle state) to the working system power state (S0). In the example of FIG. 1, the wake event analyzer 122 is implemented by executable instructions executed on the processor 108 of the user device 102. However, in other examples, the wake event analyzer 122 is implemented by instructions executed on the processor 116 of the wearable or non-wearable user device 118 and/or on the cloud-based device(s) 120. In other examples, the wake event analyzer 122 is implemented by dedicated circuitry located on one or more of the user device 102 and/or the user device 118. In some examples, one or more components of the example wake event analyzer 122 are implemented by the on-board processor 108 of the user device 102 and one or more other components are implemented by the processor 116 of the user device 118 and/or the cloud-based device(s) 120. These components may be implemented in software, firmware, hardware, or in combination of two or more of software, firmware, and hardware.

In the example system 100 of FIG. 1, the wake event analyzer 122 serves to process the sensor data generated by the respective sensor(s) 103, 110, 112 to infer a user intent to interact with the user device 102 after the device has entered the connected standby mode (S0 low-power idle state) and to instruct the user device 102 to transition to the working system power state (S0). When the example user device 102 of FIG. 1 is in the connected standby mode, the user presence detection sensor(s) 110 are active to detect change in signals emitted by the sensor(s) 110 due to the presence of a subject within the range of the sensor(s) 110. In the connected standby mode, the touch controller 106 is initially in a low power device power state (e.g., D3 cold state). Also, the user appendage detection sensor(s) 112 are selectively disabled in the connected standby mode based on instructions from the wake event analyzer 122. For instance, the wake event analyzer 122 disables the user appendage detection sensor(s) 112 when the user device 102 enters the connected standby mode to reduce power consumption of the user device 102 when not in use.

In the example of FIG. 1, the wake event analyzer 122 selectively activates the user appendage detection sensor(s) 112 and the touch controller 106 based on sensor data generated by the user presence detection sensor(s) 110 indicating that a user is within the range of the user presence detection sensor(s) 110 and, thus, present relative to the user device 102 (e.g., approaching the user device 102). As disclosed herein, the wake event analyzer 122 selectively instructs the user device 102 to transition to the working system power state (S0) based on data indicating that the user has engaged with an input device (e.g., the display screen 104).

The example wake event analyzer 122 receives and processes the sensor data from the user presence detection sensor(s) 110. In some examples, the wake event analyzer 122 receives the sensor data from the user presence detection sensor(s) 110 in substantially real-time (e.g., near the time the data is collected). In other examples, the wake event analyzer 122 receives the sensor data at a later time (e.g., periodically and/or aperiodically based on one or more settings but sometime after the activity that caused the sensor data to be generated, such as a user walking in front of the user device 102, has occurred (e.g., seconds later)). The wake event analyzer 122 can perform one or more operations on the sensor data generated by the user presence detection sensor(s) 110 such as filtering the raw signal data, removing noise from the signal data, converting the signal data from analog data to digital data, and/or analyzing the data.

Based on the sensor data generated by the user presence detection sensor(s) 110, the wake event analyzer 122 determines that a subject is present within the range of the user presence detection sensor(s) 110 and, thus, sufficiently proximate to the user device 102 to activate the user appendage detection sensor(s) 112. The wake event analyzer 122 enables the user appendage detection sensor(s) 112. When enabled, the user appendage detection sensor(s) 112 (e.g., time-of-flight depth sensor(s)) emit light pulses and measure the return of the reflected light. When the subject is within the range of the user presence detection sensor(s) 110, it is assumed the user intends to use the user device 102. Therefore, the wake event analyzer 122 also instructs the touch controller 106 to transition between device power states from the D3 cold state to the D3 hot state (e.g., such that the touch controller 106 can be detected by the bus 111 of the user device 102). Thus, in the example of FIG. 1, when the subject is detected by the user presence detection sensor(s) 110, the wake event analyzer 122 begins to transition certain components of the user device 102, such as the touch controller 106, to a working device power state in anticipation of a user input at the user device 102. However, the wake event analyzer 122 does not fully wake the device 102 based on the presence of the subject alone. Rather, to prevent false positives and to conserve power consumption, the example wake event analyzer 122 analyzes data generated by the user appendage detection sensor(s) 112 to further infer user intent to use the user device 102 and progressively transitions the device power states of the components of the user device such as the touch controller 106 (e.g., from D3 cold state to D3 hot state) based on the inferred intent.

The example wake event analyzer 122 receives and processes the sensor data from the user appendage detection sensor(s) 112. In some examples, the wake event analyzer 122 receives the sensor data from the user appendage detection sensor(s) 112 in substantially real-time (e.g., near the time the data is collected). The wake event analyzer 122 can perform one or more operations on the sensor data received from the user appendage detection sensor(s) 112 substantially as disclosed above in connection with the user presence detection sensor(s) 110 (e.g., filtering the data, removing noise).

Based on the sensor data generated by the user appendage detection sensor(s) 112, the wake event analyzer 122 determines whether the user's appendage(s) (e.g., finger(s), hand, and/or arm) are proximate to the user device 102, such as moving toward the display screen 104 and/or over the keyboard 105. For instance, the sensor data generated by the user appendage detection sensor(s) 112 can indicate that the user's hand is passing over the location(s) on the keyboard 105 within the range of the user appendage detection sensor(s) 112 based on the return time of the emitted light pulses to the sensor(s). In response to the determination that the user's appendage(s) are approaching the user device based on the sensor data from the user appendage detection sensor(s) 112, the wake event analyzer 122 instructs the touch controller 106 to transition to the D0 working device power state in anticipation of the user providing a touch input at the display screen 104.

In the example of FIG. 1, the wake event analyzer 122 analyzes the sensor data generated by the user appendage detection sensor(s) 112 to determine if the user is moving his or her appendage(s) toward the user device 102 within a first time interval of the wake event analyzer 122 detecting the presence of a subject based on the sensor data from the user presence detection sensor(s) 110 (e.g., within five seconds, ten seconds, fifteen seconds). If the example wake event analyzer 122 does not detect the user's appendage(s) relative to the user device 102 within the first threshold time limit, the example wake event analyzer 122 instructs the touch controller 106 to return to the D3 cold power state from the D3 hot state. Also, the wake event analyzer 122 disables the user appendage detection sensor(s) 112. Thus, if the subject does not approach the user device 102 within the threshold time limit of being detected by the user presence detection sensor(s) 110, the wake event analyzer 122 determines that the subject did not intend to use the user device 102. As a result, the wake event analyzer 122 returns the touch controller 106 to a lower power state and instructs the user appendage detection sensor(s) 112 to refrain from emitting light pulses to converse power. In such instances, the example wake event analyzer 122 of FIG. 1 prevents false positives with respect to waking the user device 102 and unnecessary consumption of power based on the presence of the user in the vicinity of the user device 102 alone.

In examples where the wake event analyzer 122 detects the user's appendage(s) relative to the user device within the threshold time based on the sensor data from the user appendage detection sensor(s) 112 and instructs the touch controller 106 to move to the working device power state (D0), the wake event analyzer 122 monitors for a user input at the user device 102, such as a touch event on the display screen 104, within a second time interval. The second time interval can begin when the wake event analyzer 122 detects the user's appendage(s) at the display screen 104 (e.g., within two seconds, five seconds). In particular, the wake event analyzer 122 monitors for data indicating that a user input has been received at a user input device, such as the pressing of a key of the keyboard 105, movement of the pointing device(s) 107, and/or a touch on the display screen 104. For instance, the wake event analyzer 122 can receive data from the touch controller 106 indicating that a touch event has occurred at the display screen 104 (where the touch controller 106 detects the event based on data received from the display screen touch sensor(s) 103). If the wake event analyzer 122 determines that a user input event has occurred within the second time interval, the wake event analyzer 122 determines that the user device 102 should exit the connected standby mode (S0 low-power idle state_ and move to the working system power state (S0). The wake event analyzer 122 transmits instructions that are executed by, for instance, the on-board processor 108 of the user device 102 to wake the hardware devices of the user device 102 (e.g., the display screen, a camera sensor) from the connected standby mode. For instance, the display screen 104 is turned on to enable the user to authenticate his or her identity (e.g., via entry of a password and/or facial recognition via a camera) and access applications installed on the user device 102.

If the wake event analyzer 122 does not detect a user input event at a user input device of user device 102 (e.g. at the display screen 104, at the keyboard 105, via the pointing device(s) 107) within the second time interval, the wake event analyzer 122 instructs the user device 102 to remain in the connected standby mode. Also, the wake event analyzer 122 instructs the touch controller 106 to move from the D0 working device power state to the D3 cold state. Also, the wake event analyzer 122 instructs the user appendage detection sensor(s) 112 to refrain from emitting light pulses. Thus, if a user input event is not detected within a threshold time limit despite the detection of the user's appendage(s) by the user appendage detection sensor(s) 112, the wake event analyzer 122 refrains from instructing the user device 102 to leave the connected standby mode. As such, in examples where the user was approaching the display screen 104 but moved away from the user device 102 because, for instance, the user was distracted, the wake event analyzer 122 maintains the user device 102 in the connected standby mode to prevent unnecessary power consumption.

Table 3, below, summarizes the changes in system power states for the user device 102 and device power states for the touch controller 106 in response to sensor data generated by the sensor(s) 110, 112 and/or user input(s) received at the user device 102.

TABLE 3

User Device Power Management Control

| Sensor Event | Touch Controller Device Power State | User Device System Power State |
|---|---|---|
| No user presence detected by user presence detection sensor(s) 110 | D3 cold state | S0 low-power idle state (connected standby mode) |
| User presence detected by user presence detection sensor(s) 110 | D3 hot state | S0 low-power idle state |
| User appendage detected by user appendage detection sensor(s) 112 | D0 working device power state | S0 low-power idle state |
| User input received at user device 102 | D0 working device power state | S0 (working system power state) |

The example system 100 of FIG. 1 provides for management of the operational states of the user device 102. When the user device is in the connected standby mode, the user presence detection sensor(s) 110 consume, for instance, 2 mW of power. When the user appendage detection sensor(s) 112 are enabled, the user appendage detection sensor(s) 112 consume, for instance, an additional 2 mW of power. When the touch controller 106 is moved to the D0 state after the presence of the user's appendage(s) is detected by the user appendage detection sensor(s) 112, the touch controller 106 consumes, for instance, an additional 43 mW of power. Thus, the multi-stage process for waking the user device 102 results in the user device 102 being in low-powered state(s) until the wake event analyzer 122 confirms user intent to interact with the user device 102 based on receipt of a user input at the user device 102 (e.g., a touch event at the display screen 104). The multi-stage process for waking the user device 102 avoids false wakes and can save, for instance, 250 mW corresponding to sample processing power consumed when the user device 102 is in the working system power state (S0) by enabling the user appendage detection sensor(s) 112 to verify user intent when the presence of the user is detected by the user presence detection sensor(s) 110 rather than automatically waking the user device 102 based on user presence alone.

Figure 2:
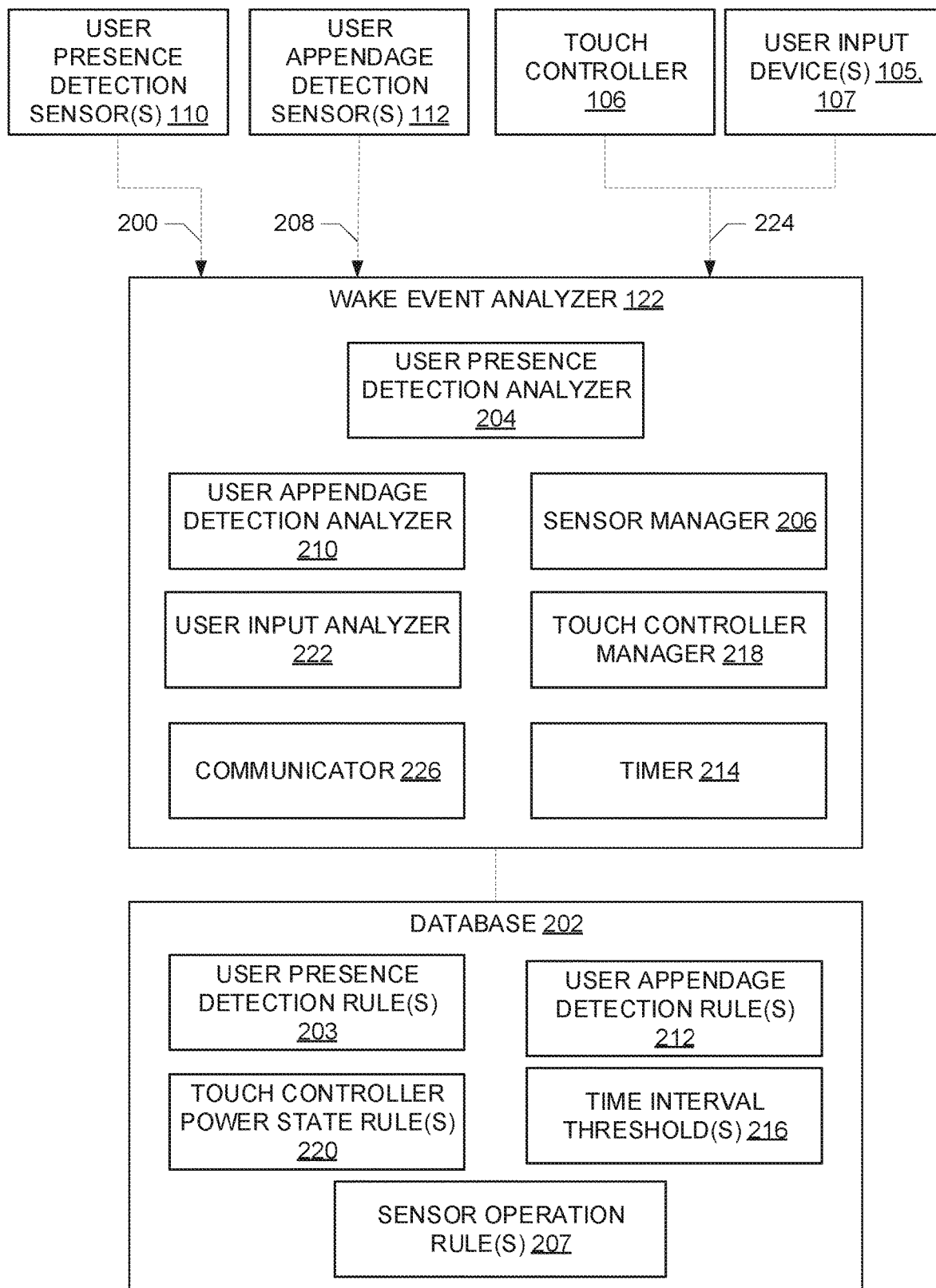
FIG. 2 is a block diagram of an example implementation of the wake event analyzer of FIG. 1.

FIG. 2 is a block diagram of an example implementation of the wake event analyzer 122 of FIG. 1. As mentioned above, the wake event analyzer 122 is constructed to identify user interactions relative to the user device 102 and to generate instructions that cause the user device 102 to transition from a standby power mode (e.g., connected standby mode) to a working power mode. In the example of FIG. 2, the wake event analyzer 122 is implemented by one or more of the processor 108 of the user device 102, the processor 116 of the user device 118, and/or cloud-based device(s) 120 (e.g., server(s), processor(s), and/or virtual machine(s) in the cloud 120 of FIG. 1). In some examples, some of the user interaction analysis is implemented by the wake event analyzer 122 via a cloud-computing environment and one or more other parts of the analysis is implemented by the processor 108 of the user device 102 being controlled and/or the processor 116 of a second user device 118 such as a wearable device.

As illustrated in FIG. 2, the example wake event analyzer 122 receives first sensor data 200 from the user presence detection sensor(s) 110 of the example user device 102 of FIG. 1. The sensor data 200 can be stored in a database 202. In some examples, the wake event analyzer 122 includes the database 202. In other examples, the database 202 is located external to the wake event analyzer 122 in a location accessible to the wake event analyzer 122 as shown in FIG. 2.

The example wake event analyzer 122 of FIG. 2 includes a user presence detection analyzer 204. In this example, the user presence detection analyzer 204 provides means for analyzing the sensor data 200 generated by the user presence detection sensor(s) 110. In particular, the user presence detection analyzer 204 analyzes the sensor data 200 to determine if a subject is within the range of the user presence detection sensor(s) 110 and, thus, is near enough to the user device 102 to suggest that the user is about to use the user device 102. The user presence detection analyzer 204 analyzes the sensor data 200 based on one or more user presence detection rule(s) 203. The user presence detection rule(s) 203 can be defined based on user input(s) and stored in the database 202.

The user presence detection rule(s) 203 can define, for instance, threshold time-of-flight measurements by the user presence detection sensor(s) 110 that indicate presence of the subject within the range of the user presence detection sensor(s) (e.g., measurements of the amount of time between emission of a wave pulse, reflection off a subject, and return to the sensor). In some examples, the user presence detection rule(s) 203 define threshold distance(s) for determining that a subject is within proximity of the user device 102. In such examples, the user presence detection analyzer 204 determines the distance(s) based on the time-of-flight measurement(s) in the sensor data 200 and the known speed of the light emitted by the sensor(s) 110. In some examples, the user presence detection analyzer 204 identifies changes in the depth or distance values over time and detects whether the user is approaching the user device 102 or moving away from the user device 102 based on the changes. The threshold time-of-flight measurement(s) and/or distance(s) for the user presence sensor data 200 can be based on the range of the sensor(s) 110 in emitting pulses. In some examples, the threshold time-of-flight measurement(s) and/or distance(s) are based on user-defined reference distances for determining that a user is near or approaching the user device 102 as compared to simply being in the environment in which the user device 102 and the user are both present.

The example wake event analyzer 122 of FIG. 2 includes a sensor manager 206. In this example, the sensor manager 206 provides means for enabling or disabling the user appendage detection sensor(s) 112 of the user device 102 of FIG. 1 based on the analysis of the sensor data 200 by the user presence detection analyzer 204. If the user presence detection analyzer 204 determines that a subject is proximate to (and, in some examples, approaching) the user device 102 based on the sensor data 200 and the user presence detection rule(s) 203, the sensor manager 206 instructs the user appendage detection sensor(s) 112 to emit light pulses and generate sensor data based on time-of-flight measurements. In some examples, the sensor manager 206 disables the user presence detection sensor(s) 110 when the user appendage detection sensor(s) 112 are activated to conserve. In other examples, the user presence detection sensor(s) 110 remain active and emit light pulses when the user appendage detection sensor(s) 112 are activate. In such examples, the sensor data 200 from the user presence detection sensor(s) 110 and the sensor data 208 from the user appendage detection sensor(s) 112 can be used to increase confidence of the presence of the user relative to the user device 102. The sensor manager 206 directs the operational state of the user presence detection sensor(s) 110 and/or the user appendage detection sensor(s) 112 (e.g., enabled and emitting light pulses or disabled and not emitting light pulses) based on sensor operation rule(s) 207 stored in the database 202 and defined by user input(s).

When the user appendage detection sensor(s) 112 of the user device 102 of FIG. 1 are active, the example wake event analyzer 122 receives second sensor data 208 from the user appendage detection sensor(s) 112. The sensor data 208 can be stored in the database 202.

The example wake event analyzer 122 of FIG. 2 includes a user appendage detection analyzer 210. In this example, the user appendage detection analyzer 210 provides means for analyzing the sensor data 208 generated by the user appendage detection sensor(s) 112. The user appendage detection analyzer 210 analyzes the sensor data 208 to determine if an appendage of the user (e.g., an arm, a hand, finger(s)) is proximate to the user device 102 (e.g., proximate to the display screen 104, over the keyboard 105). As disclosed herein, the user appendage detection sensor(s) 112 are coupled to the user device 102 at location(s) on the user device 102 proximate the user input device(s) that the user is about to interact with, such as location(s) where the user's appendage(s) are likely to pass over as the user moves toward the user device 102. For instance, the user appendage detection sensor(s) 112 can be at the keyboard 105 of the user device 102 of FIG. 1 such that the user's appendage(s) are within the range of the user appendage detection sensor(s) 112 as the user reaches for the display screen 104 and/or the keyboard 105. Thus, based on the location of the sensor(s) 112, the sensor data 208 generated by the user appendage detection sensor(s) 112 can be used to infer user activity relative to the user device 102.

The example user appendage detection analyzer 210 analyzes the sensor data 208 generated by the user appendage detection sensor(s) 112 based on one or more user appendage detection rule(s) 212. The user appendage detection rule(s) 212 can be defined based on user input(s) and stored in the database 202. The user appendage detection rule(s) 212 can define threshold time-of-flight measurements measured by the user appendage detection sensor(s) 112 based on the reflection of the light pulses emitted by the user appendage detection sensor(s) 112. In some examples, the user appendage detection rule(s) 212 define threshold distances for determining that an appendage of the subject is proximate to the user device 102 and/or components thereof (e.g., display screen 104). In such examples, the user appendage detection analyzer 210 determines the distance(s) based on the time-of-flight measurement(s) in the sensor data 208 and the known speed of the light pulses emitted by the sensor(s) 110. The threshold time-of-flight measurement(s) and/or distance(s) for the user appendage sensor data 208 can be based on the range of the sensor(s) 112 in emitting pulses. In some examples, the threshold time-of-flight measurement(s) and/or distance(s) for the user appendage sensor data 208 are based on user-defined reference distances for determining that an appendage of the user is, for example, extended over the keyboard 105 of the user device 102, disposed proximate to a bezel of the display screen 104, etc.

The example wake event analyzer 122 of FIG. 2 includes a timer 214. In this example, the timer 214 provides means for monitoring a duration of time for which the user appendage detection sensor(s) 112 should be enabled after detection of the presence of the user by the user presence detection sensor(s) 110. The timer 214 monitors the amount of time that has passed based on time interval threshold(s) 216 stored in the database 202 and defined by user input(s). The time interval threshold(s) 216 define a time interval for activation of the user appendage detection sensor(s) 112. The time interval begins (i.e., the timer 214 is started) when the user appendage detection sensor(s) 112 are activated in response to detection of a subject by the user presence detection analyzer 204. The time interval can have a duration of, for instance, several seconds (e.g., five seconds, ten seconds) based on, for instance, an expected time for a user to move toward the user device 102. If the user appendage detection analyzer 210 does not detect the user's appendage(s) proximate to the user device 102 by the end of the time interval as monitored by the timer 214, the sensor manager 206 instructs the user appendage detection sensor(s) 112 to deactivate or refrain from emitting light pulses.

The example wake event analyzer 122 of FIG. 2 includes a touch controller manager 218. In this example, the touch controller manager 218 provides means for instructing the touch controller 106 of the user device 102 of FIG. 1 to transition between device power states (e.g., between the D0 working device power state and the low power device power state(s) (e.g., D3 hot state, D3 cold state)). The example touch controller manager 218 determines the power state of the touch controller 106 based on touch controller power state rule(s) 220 stored in the database 202 and defined based on user input(s). For instance, if the user presence detection analyzer 204 determines that a subject is proximate to the user device 102 based on the sensor data 200 generated by the user presence detection sensor(s) 110 and the user presence detection rule(s) 203, the touch controller manager 218 instructs the touch controller 106 to move from the D3 cold state to the D3 hot state based on the touch controller power state rule(s) 220. Thus, the touch controller 106 remains in a low power state when only user presence is detected. If the user appendage detection analyzer 210 detects the presence of a user appendage proximate to the user device 102 based on the sensor data 208 generated by the user appendage detection sensor(s) 112 and the user appendage detection rule(s) 212, the touch controller manager 218 instructs the touch controller 106 to move from the D3 hot state to the D0 working device power state.

The timer 214 of the example wake event analyzer 122 monitors a time for which the touch controller 106 is in the D3 hot state or the D0 working device power state and, thus, consuming more power than when the touch controller 106 is in the D3 cold state). For example, the time interval threshold 216 that defines the time limit for detecting the user appendage(s) proximate to the user device 102 before the activated user appendage detection sensor(s) 112 are disabled can also serve as a trigger for the touch controller manager 218 to instruct the touch controller 106 to return to the D3 cold state after entering the D3 hot state.

The example wake event analyzer 122 of FIG. 2 includes a user input analyzer 222. In this example, the user input analyzer 222 provides means for analyzing user input event data 224 received from the touch controller 106 in response to a touch event on the display screen 104 and/or from other user input devices of the user device 102 such as the keyboard 105 in response to the user pressing of a key of the keyboard and/or the pointing device(s) 107 in response to the user moving a mouse. For example, when the user touches the display screen 104 while the user device 102 is in the connected standby mode, the touch controller 106 sends the data 224 to the user input analyzer 222 indicating that a touch event has been detected (e.g., based on voltage changes detected by the sense line(s) of the display screen 104). Based on the user input event data 224 indicating touch at the display screen 104, the user input analyzer 222 confirms the user intent to use the user device 102 (e.g., as evidenced by the touch event) and determines that the user device 102 should exit the connected standby mode (S0 low-power idle state) and transition to the working system power state (S0).

In the example of FIG. 2, the timer 214 monitors the time in which the user input analyzer 222 receives the user input event data 224 from the touch controller 106 and/or user input device(s) (e.g., the keyboard 105). In particular, the timer 214 determines if the user input analyzer 222 receives the data 224 indicating a user input event at the user device 102 within a threshold time as defined by the time interval threshold(s) 216 stored in the database 202. The threshold for receiving the user input event data 224 can include, for instance, one second, two seconds, etc. The time interval for the occurrence of a user input event at, for instance, the display screen 104 can be defined based on user input(s) in view of an expected amount of time for a user to touch the display screen 104 when the user is approaching the display screen 104 and within the range of the user appendage detection sensor(s) 112.

If the user input event data 224 is not received within the time interval, the user input analyzer 222 determines that the user did not intend to use the user device 102. As a result, the touch controller manager 218 instructs the touch controller 106 to return to the D3 cold state from the D0 working device power state. Also, the sensor manager 206 instructs the user appendage detection sensor(s) 112 to refrain from emitting light pulses.

If the user input analyzer 222 receives the user input event data 224 within the threshold time interval, the user input analyzer 222 determines that the user wishes to use the user device 102. The example wake event analyzer 122 includes a communicator 226. The communicator 226 transmits instructions generated by the user input analyzer 222 to other components of the user device 102 (e.g., a display controller) to cause the hardware devices of the user device 102 to wake up and the user device 102 to exit the connected standby mode and enter the working system power state (S0). As a result of the instructions received from the communicator 226, the display screen 104 of the user device 102 is turned on.

In some examples, the sensor manager 206 instructs the user appendage detection sensor(s) 112 to refrain from emitting pulses while the user device 102, 300 is in the working system power state (S0) to reduce power consumption. In some examples, the sensor manager 206 instructs the user presence detection sensor(s) 110 to refrain from emitting pulses while the user device 102, 300 is in the working system power state (S0) to reduce power consumption. In other examples, the user presence detection sensor(s) 110 and/or the user appendage detection sensor(s) 112 remain active to determine whether or not the user is proximate the user device 102 if, for instance, a user input has not been received for a period of time. In some such examples, data generated by the user presence detection sensor(s) 110 and/or the user appendage detection sensor(s) 112 while the user device 102 is in the working system power state (S0) can be used by, for instance, the processor 108 of the user device 102 to determine if the user device should re-enter the connected standby mode.

Figure 3:
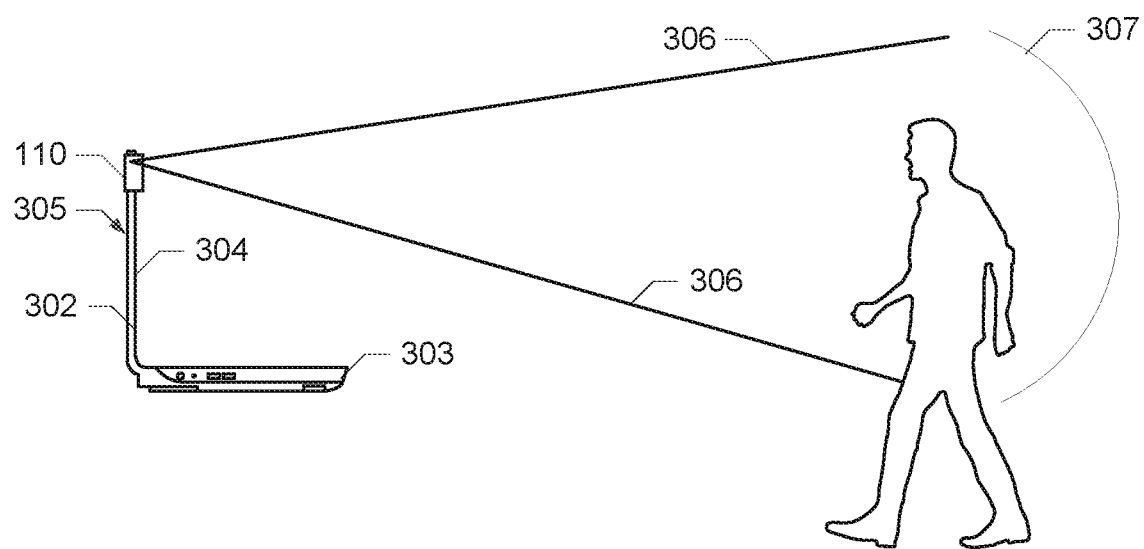
FIG. 3 illustrates an example user device constructed in accordance with teachings of this disclosure and, in particular, illustrates a first user detection sensor of the user device.

FIG. 3 illustrates an example user device 300 in which examples disclosed herein may be implemented. In FIG. 3, the example user device 300 is a laptop. However, as disclosed herein, other types of user devices, such as desktops or electronic tablets, can be used to implement the examples disclosed herein.

The example user device 300 includes one or more of the user presence detection sensors 110 of FIG. 1. As disclosed herein, the user presence detection sensor(s) 110 can include proximity sensor(s) such as time-of-flight sensor(s). In the example of FIG. 3, the user presence detection sensor(s) 110 are coupled to a bezel 302 of the user device 300 and, in particular, a portion of the bezel 302 that is disposed above a display screen 304 of the user device 300 such that the sensor(s) 110 face an environment in which the user device 102 is located. For instance, the user presence detection sensor(s) 110 can be disposed proximate to a camera sensor of the user device 300. In other examples, the sensor(s) 110 are located along one or more of the edges of a base 303 or a lid 305 of the user device 102 so that user presence may be detected even when the lid is closed. In FIG. 3, lines 306 represent a first distance or range (e.g., a radius as represented by arc 307) over which the sensor(s) 110 can detect subjects or objects (e.g., by emitting light pulses) in an environment in which the user device 300 is located. As result of the position of the user presence detection sensor(s) 110 on the display screen bezel 302, the sensor(s) 110 can detect a user 308 who is proximate to and may be approaching the user device 300.

Figure 4:
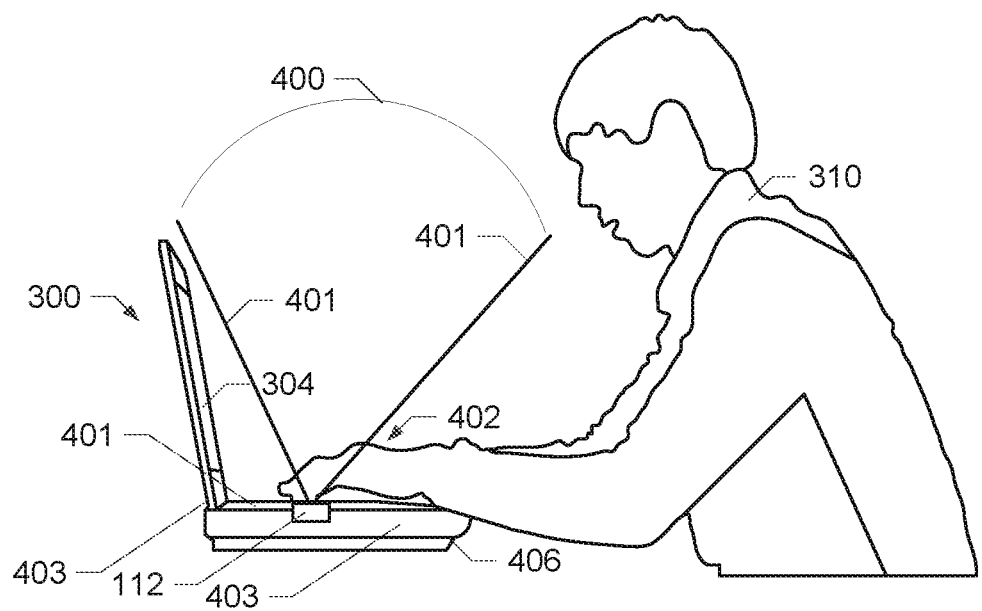
FIG. 4 illustrates the example user device of FIG. 3 and, in particular, illustrates a second user detection sensor of the user device.

FIG. 4 illustrates the example user device 300 of FIG. 3 including one or more user appendage detection sensor(s) 112 (e.g., depth sensor(s)). As disclosed above, when the user presence detection sensor(s) 110 detect the presence of the user 308 relative to the user device 300, the sensor manager 206 of the wake event analyzer 122 (FIG. 2) instructs the user appendage detection sensor(s) 112 to emit light pulses. As shown in FIG. 4, the user appendage detection sensor(s) 112 are coupled to a keyboard 401 of the user device 300. Thus, when the user 308 moves his or her appendage(s) 402 (e.g., hand) toward the user device 300 (e.g., over the keyboard 401, toward the display screen 304, etc.), the user's appendage(s) 402 are within a second distance or range (e.g., a radius as represented by arc 400 and lines 405) of the user appendage detection sensor(s) 112. As such the user appendage detection sensor(s) 112 detect the presence of the user's appendage(s) 402 within the sensor range. In the examples of FIGS. 3 and 4, the second distance corresponding to the range of the user appendage detection sensor(s) 112 is less than the first distance corresponding to the range of the user presence detection sensor(s) 110. The second distance associated with the user appendage detection sensor(s) 112 can be, for example, less than 50% less than the first distance associated with the user presence detection sensor(s) 110, less than 25% of the first distance, less than 10% of the first distance, etc.

Based on the detection of the user's appendage(s) 402 and the location of the user appendage detection sensor(s) 112, the wake event analyzer 122 infers intent of the user 308 to use the user device 300 and anticipates a touch event on the display screen 304 by instructing the touch controller 106 (FIGS. 1 and 2) to move to the working device power state (D0). The user appendage detection sensor(s) 112 can be disposed at other locations on the user device 300, such as at a hinge 403 of the device between the display screen 304 and the base 303 of the user device 300, at outward facing edge 406 of the base 303, and/or other locations the user device 300 where the user's appendage(s) 402 are expected to move or pass over as the user 308 moves to interact with the user device 102.

While an example manner of implementing the wake event analyzer 122 of FIG. 1 is illustrated in FIG. 2, one or more of the elements, processes and/or devices illustrated in FIG. 2 may be combined, divided, re-arranged, omitted, eliminated and/or implemented in any other way. Further, the example database 202, the example user presence detection analyzer 204, the example sensor manager 206, the example user appendage detection analyzer 210, the example timer 214, the example touch controller manager 218, the example user input analyzer 222, the example communicator 226 and/or, more generally, the example wake event analyzer 122 of FIG. 2 may be implemented by hardware, software, firmware and/or any combination of hardware, software and/or firmware. Thus, for example, any of the example database 202, the example user presence detection analyzer 204, the example sensor manager 206, the example user appendage detection analyzer 210, the example timer 214, the example touch controller manager 218, the example user input analyzer 222, the example communicator 226 and/or, more generally, the example wake event analyzer 122 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 202, the example user presence detection analyzer 204, the example sensor manager 206, the example user appendage detection analyzer 210, the example timer 214, the example touch controller manager 218, the example user input analyzer 222, and/or the example communicator 226 is/are hereby expressly defined to include a non-transitory computer readable storage device or storage disk such as a memory, a digital versatile disk (DVD), a compact disk (CD), a Blu-ray disk, etc. including the software and/or firmware. Further still, the example wake event analyzer of FIGS. 1 and/or 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
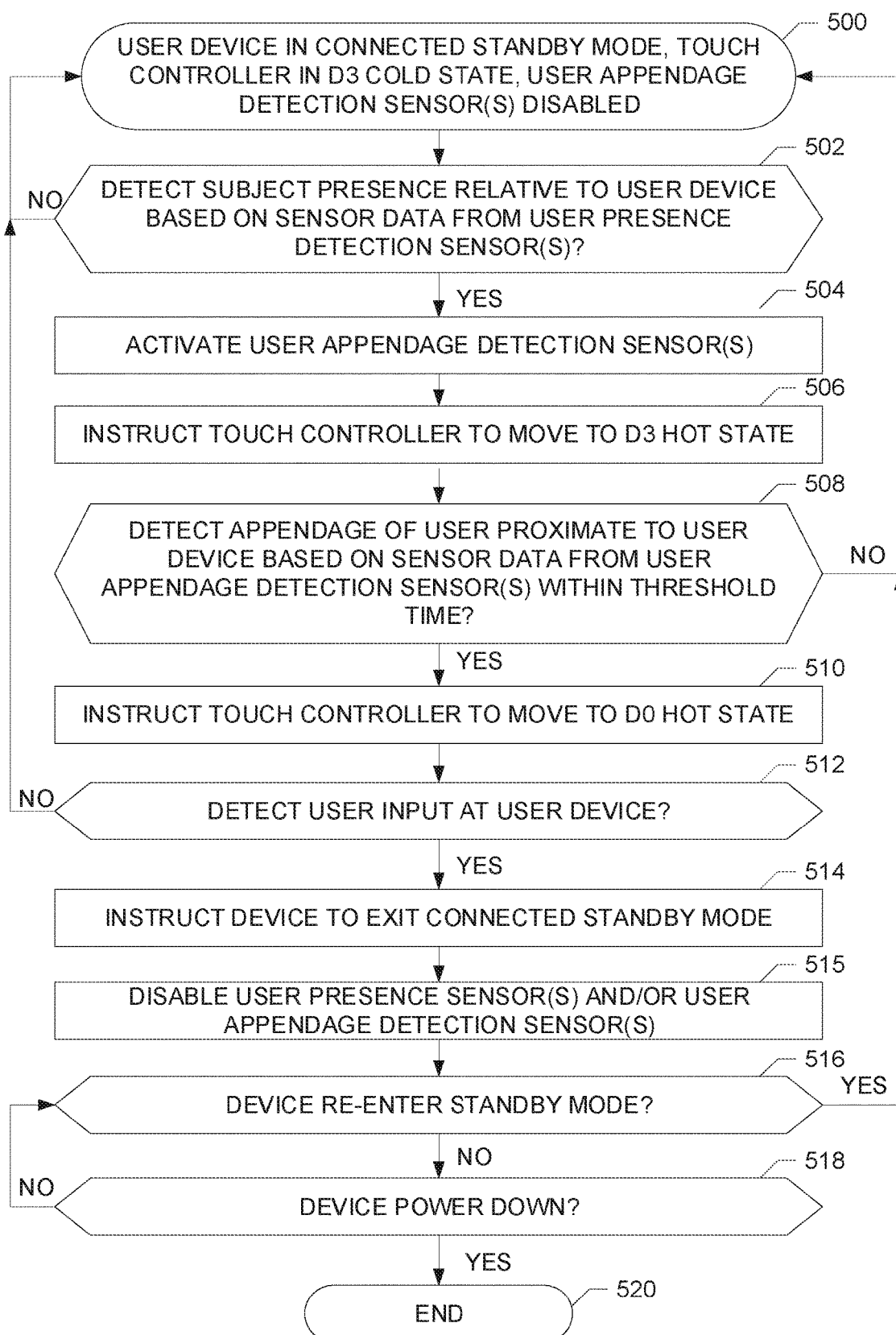
FIG. 5 is a flowchart representative of example machine readable instructions which may be executed to implement the example wake event analyzer of FIG. 1.

A flowchart representative of example hardware logic, machine readable instructions, hardware implemented state machines, and/or any combination thereof for implementing the wake event analyzer 122 of FIGS. 1 and/or 2 is shown in FIG. 5. The machine readable instructions may be one or more executable programs or portion(s) of an executable program for execution by a computer processor such as the processor 122 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 122, but the entire program and/or parts thereof could alternatively be executed by a device other than the processor 122 and/or embodied in firmware or dedicated hardware. Further, although the example program is described with reference to the flowchart illustrated in FIG. 5, many other methods of implementing the example wake event analyzer 122 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions that, when executed, implement the example wake event analyzer 122 of FIGS. 1 and/or 2. The example instructions of FIG. 5 can be executed by one or more processors of, for instance, the user device 102, 300, a second user device such as a wearable device (e.g., the user device 118) and/or a cloud-based device (e.g., the cloud-based device(s) 120). The instructions of FIG. 5 can be executed in substantially real-time as sensor data is received by the wake event analyzer 122 or at some time after the sensor data is received by the wake event analyzer 122.

The example instructions of FIG. 5 begin when the user device 102, 300 is in the connected standby power mode (S0 low-power idle state) (block 500). In such examples, the user device 102, 300 is in a low-powered operational state with the display screen 104 turned off and execution of certain applications by the processor 108 suspended, but the user device 102 remains connected to the Internet to periodically update data such as emails. In the example of FIG. 5, the touch controller 106 of the user device 102, 300 is in a low-power device power state, D3 cold state, when the user device 102, 300 is in the connected standby mode. Also, the user appendage detection sensor(s) 112 are disabled and, thus, not emitting light pulses.

The user presence detection sensor(s) 110 generate sensor data 200 that is analyzed by the user presence detection analyzer 204 of the example wake event analyzer 122 of FIG. 2 to determine if a subject (e.g., the user 308 of FIG. 3) is proximate to the user device 102 in an environment in which the user device 102 is located (block 502). The user presence detection analyzer 204 analyzes the sensor data 200 based on the user presence detection rule(s) 203 stored in the database 202 to determine if the user is proximate to the user device 102 based on threshold values with respect to the time for the emitted light pulses to return to the user presence detection sensor(s) 110 and/or the calculated distances of the subject relative to the device 102.

In the example of FIG. 5, if the user presence detection analyzer 204 does not detect a user proximate of the user device 102, 300 (e.g., within the range of the user presence detection sensor(s) 110), the wake event analyzer 122 maintains the device in the connected standby mode with the touch controller 106 in the D3 cold state and the user appendage detection sensor(s) 112 disabled (block 500).

In the example of FIG. 5, if the user presence detection analyzer 204 detects the user proximate to the user device 102 based on the sensor data 200 from the user presence detection sensor(s) 110, the sensor manager 206 of the example user device 102 instructs the user appendage detection sensor(s) 112 of the user device 102 to begin emitting light pulses (block 504). Also, the touch controller manager 218 instructs the touch controller 106 to transition device power states by moving from the D3 cold state to the D3 hot state in view of a potential touch event on the display screen 104 (block 506).

The example user appendage detection analyzer 210 determines if the user's appendage(s) 402 (e.g., an arm, a hand, and/or finger(s)) of the user are disposed proximate to the user device 102, 300 (e.g., over the keyboard 105, 401) within a threshold time interval based on the sensor data 208 generated by the user appendage detection sensor(s) 112 (block 508). The user appendage detection analyzer 210 analyzes the sensor data 208 generated by the user appendage detection sensor(s) 112 based on the user appendage detection rule(s) 212 and the time interval threshold(s) 216 stored in the database 202 to determine if the user's appendage(s) have moved within the range of the user appendage detection sensor(s) 112 within the threshold time interval as, for example, the user reaches for the display screen 104, 304 of the user device 102, 300. For example, the user appendage detection analyzer 210 determines if the user's appendage(s) 402 have moved over a keyboard 105, 401 of the user device 102, 300 within the threshold time interval after the presence of the user has been detected by the user presence detection analyzer 204.

In the example of FIG. 5, if the user appendage detection analyzer 210 does not detect the user's appendage(s) proximate to the user device 102, 300 within the threshold time limit, the sensor manager 206 disables the user appendage detection sensor(s) 112, the touch controller manager 218 instructs the touch controller 106 to return to the D3 cold state, and control returns to block 500. In such examples, the wake event analyzer 122 determines that the user did not intend to use the user device 102, 300 due to the absence of the user's appendage(s) approaching the user device 102, 300 within a threshold time after the user's presence near the user device 102, 300 was detected by the user presence detection sensor(s) 110.

In the example of FIG. 5, if the user appendage detection analyzer 210 detects the user's appendage(s) 402 proximate to the user device 102, 300 (e.g., near the display screen 104, 304) within the threshold time limit based on the sensor data 208 generated by the user appendage detection sensor(s) 112, the touch controller manager 218 instructs the touch controller 106 to transition device power states by moving from the D3 hot state to the D0 state, or a working device power state, in anticipation of a touch event on the display screen 104, 304 (block 510).

The user input analyzer 222 of the example wake event analyzer 122 of FIG. 2 analyzes user input event data 224 received from, for instance, the touch controller 106 and/or other user input device(s) of the user device 102, 300 (e.g., the keyboard 105, the pointing device(s) 107) to determine if a user input was received at the user device 102 within a threshold period of time (e.g., as defined by the time interval threshold(s) 216 stored in the database 202) (block 512). The user input can include, for instance, a touch on the display screen 104, the pressing of a key of the keyboard 105, the moving of the pointing device 107, etc.

In the example of FIG. 5, if the user input analyzer 222 does not detect a user input event at the user device 102, 300 within the threshold time limit, the sensor manager 206 disables the user appendage detection sensor(s) 112, the touch controller manager 218 instructs the touch controller 106 to return to the D3 cold state, and control returns to block 500. In such examples, the wake event analyzer 122 determines that the user did not intend to use the user device 102, 300 due to the absence of a user input at the user device 102, 300 within a threshold time after the user's appendage(s) were detected proximate to the user device 102 by the user appendage detection sensor(s) 112.

In the example of FIG. 5, if the user input analyzer 222 determines that a user input has occurred at the user device 102, 300 within the threshold time period, the communicator 226 of the example wake event analyzer 122 of FIG. 2 instructs, for instance, the processor 108 of the user device 102 to wake up the other components of the user device 102 (e.g., a display controller) and cause the user device 102 to exit the connected standby mode (S0 low-power idle state) and enter the working system power state (S0) (block 514). As a result of the instructions received from the communicator 226, the display screen 104 of the user device 102 is turned on and the user can provide input(s) to interact with the user device 102, 300. In the example of FIG. 5, the sensor manager 206 instructs the user presence detection sensor(s) 110 and/or the user appendage detection sensor(s) 112 to refrain from emitting pulses while the user device 102, 300 is in the high power working state (S0) to reduce power consumption while the user is using the user device 102, 300 (block 515). In other examples, the sensor manager 206 may disable the user presence detection sensor(s) when the user appendage detection sensor(s) 112 are activated at block 504. In other examples, the user presence detection sensor(s) 110 remain activated when the user device 102 is in the connected standby mode and the working system power state.

In the example of FIG. 5, if the user device 102, 300 re-enters the connected standby mode after, for instance, a period of inactivity of the user device 102, 300, control returns to block 500 to monitor for the presence of the user proximate to the user device 102, 300 and to infer user intent to resume use of the device (block 516). The example instructions of FIG. 5 end when the user device 102, 300 is powered off (blocks 518, 520).

Figure 6:
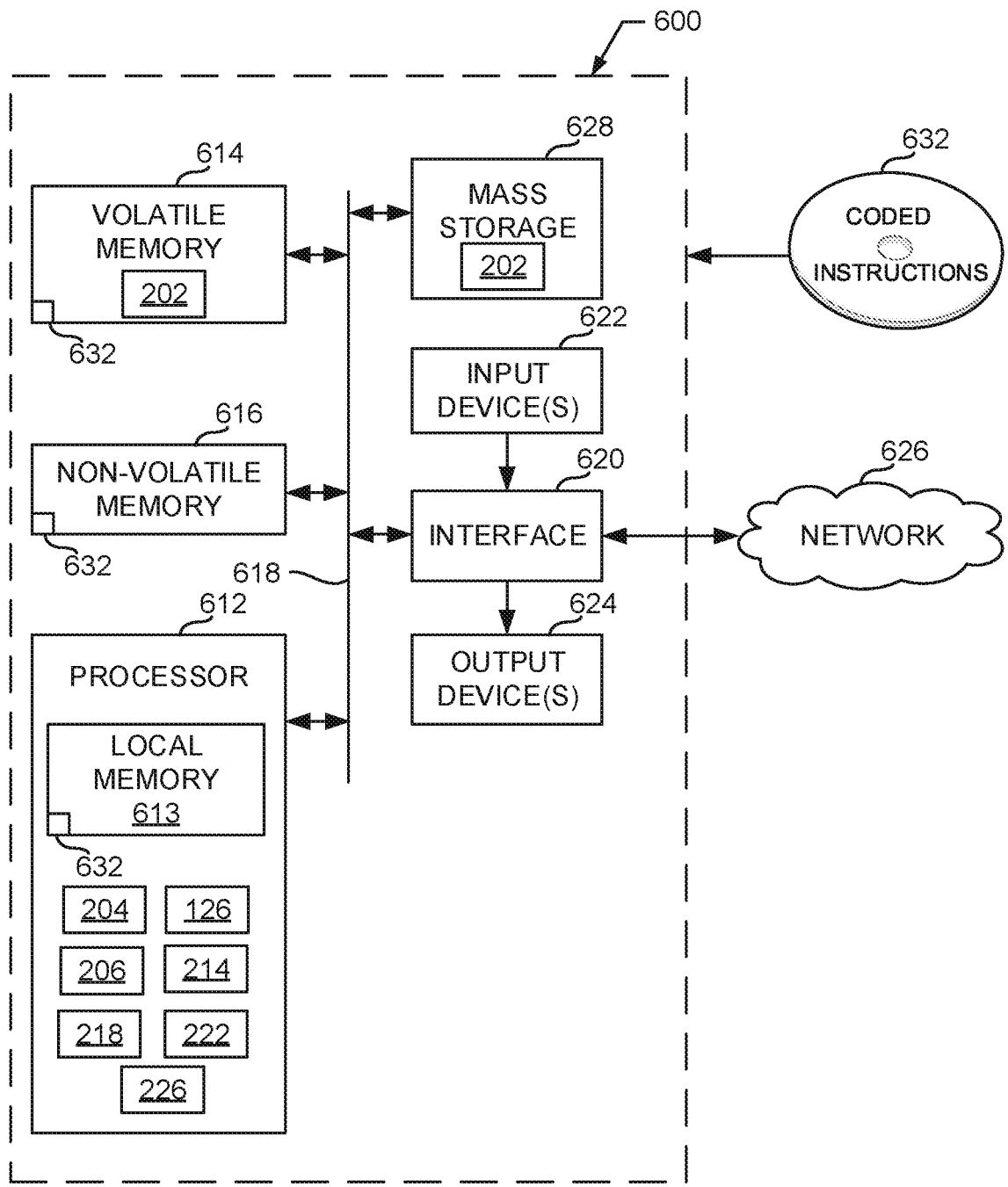
FIG. 6 is a block diagram of an example processor platform structured to execute the instructions of FIG. 5 to implement the example wake event analyzer of FIGS. 1 and/or 2.

FIG. 6 is a block diagram of an example processor platform 600 structured to execute the instructions of FIG. 6 to implement the example wake event analyzer 122 of FIGS. 1 and/or 2. The processor platform 600 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a headset or other wearable device, or any other type of computing device.

The processor platform 600 of the illustrated example includes a processor 122. The processor 122 of the illustrated example is hardware. For example, the processor 122 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example user presence detection analyzer 204, the example sensor manager 206, the example user appendage detection analyzer 210, the example timer 214, the example touch controller manager 218, the example user input analyzer 222, and the example communicator 226.

The processor 122 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 122. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 6 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus, and articles of manufacture have been disclosed that provide for power management of operational states of an electronic user device (e.g., a phone, a PC, a tablet, etc.). Examples disclosed herein transition the device from a connected standby mode to a fully operational state in stages based on verification of user actions relative to the device. Instead of waking the device based on user presence alone, example disclosed herein verify user intent to use the device based on detection of an appendage of the user moving proximate to the user device and based on a use input such as a touch of the touch screen before instructing the system to exit the connected standby mode. Examples disclosed herein transition the user device and/or components thereof to higher power states in two or more stages based on increasing confidence of user intent to use the user device. Thus, example disclosed herein avoid false wake triggers that would cause the user device to consume unnecessary power if woken only based on presence of the subject near the device.

Example methods, apparatus, systems, and articles of manufacture to implement wake-on-touch display screen devices are disclosed herein. Further examples and combinations thereof include the following:

Example 1 includes an electronic device including a touch screen; a touch controller; a first sensor; a second sensor; a user presence detection analyzer to analyze first sensor data generated by the first sensor to detect a presence of a subject proximate to the electronic device; a user appendage detection analyzer to analyze second sensor data generated by the second sensor to detect a presence of an appendage; a touch controller manager to cause the touch controller to (a) transition from a first power state to a second power state in response to the user appendage detection analyzer detecting the presence of the subject and (b) transition from the second power state to a third power state in response to the user appendage detection analyzer detecting the presence of the appendage; and a processor to power on the touch screen in response to a user input after the touch controller is in the third power state.

Example 2 includes the electronic device as defined in example 1, further including a user input analyzer to detect touch on the display screen when the touch controller is in the third power state based on data generated by the touch controller.

Example 3 includes the electronic device as defined in example 2, wherein the touch controller manager is to instruct the touch controller to transition from the third power state to the first power state if the user input analyzer fails to detect the touch within a threshold time.

Example 4 includes the electronic device as defined in examples 1 or 2, wherein the touch controller is to consume a greater amount of power in the second power state than in the first power state and the touch controller is to consume a greater amount of power in the third power state than in the first power state.

Example 5 includes the electronic device as defined in example 1, further including a sensor manager to selectively activate the second sensor based on the first sensor data.

Example 6 includes the electronic device as defined in example 5, wherein the sensor manager is to deactivate the second sensor if the user appendage detection analyzer does not detect the appendage within a threshold time.

Example 7 includes the electronic device as defined in example 1, wherein the touch controller is to instruct the touch controller to transition from the second power state to the third power state if the user appendage detection analyzer detects the presence of the appendage within a threshold time.

Example 8 includes the electronic device as defined in example 1, wherein the touch controller is to instruct the touch controller to transition from the second power state to the first power state if the user appendage detection analyzer fails to detect the presence of the appendage within a threshold time.

Example 9 includes a non-transitory computer readable medium comprising instructions that, when executed, cause a computing device to at least: detect a presence of a user proximate to the computing device based on first sensor data generated by a first sensor of the computing device; instruct a touch controller of the computing device to transition from a first power state to a second power state in response to the presence of the user; detect a presence of an appendage of the user based on second sensor data generated by a second sensor of the computing device; instruct the touch controller to transition from the second power state to a third power state in response to the detection of the appendage; and cause the computing device to exit a connected standby mode in response to a user input.

Example 10 includes the non-transitory computer readable medium as defined in example 9, wherein the instructions, when executed, further cause the computing device to activate the second sensor in response to detection of the user.

Example 11 includes the non-transitory computer readable medium as defined in example 10, wherein the instructions, when executed, further cause the computing device to deactivate the second sensor based on the second sensor data.

Example 12 includes the non-transitory computer readable medium as defined in examples 9 or 10, wherein the instructions, when executed, further cause the computing device to instruct the touch controller to move from the second power state to the third power state in response to detection of the appendage within a threshold time.

Example 13 includes the non-transitory computer readable medium as defined in any of examples 9-11, wherein the instructions, when executed, further cause the computing device to instruct the touch controller to move from the second power state to the first power state in response to the appendage not being detected within a threshold time.

Example 14 includes the non-transitory computer readable medium as defined in any of examples 9-11, wherein the third power state is a working device power state for the touch controller.

Example 15 includes the non-transitory computer readable medium as defined in example 9, wherein the instructions, when executed, further cause the touch controller to move from the third power state to the first power state if the user input is not detected within a threshold time interval.

Example 16 includes a computing device including a display screen; a first sensor to detect a presence of a user in an environment; a second sensor to detect a presence of an appendage of the user; and at least one processor to control a power state of the computing device based on first data generated by the first sensor and second data generated by the second sensor.

Example 17 includes the computing device of example 16, wherein the first sensor is carried by a bezel of the display screen.

Example 18 includes the computing device as defined in examples 16 or 17, further including a keyboard, wherein the second sensor is proximate to the keyboard.

Example 19 includes the computing device as defined in example 16, wherein the first sensor includes a first proximity sensor.

Example 20 includes the computing device as defined in example 19, wherein the second sensor includes a second proximity sensor.

Example 21 includes the computing device as defined in example 16, wherein the power state includes a connected standby state and a working power state.

Example 22 includes the computing device of example 16, further including a touch controller, the at least one processor to determine a power state of the touch controller based on at least one of the first data or the second data.

Example 23 includes the computing device as defined in example 16, wherein the at least one processor is to disable the second sensor in response to the detection of a touch on the display screen.

Example 24 includes a method including detecting, by executing an instruction with at least one processor, a presence of a user proximate to a computing device based on first sensor data generated by a first sensor of the computing device; instructing, by executing an instruction with the at least one processor, a touch controller of the computing device to transition from a first power state to a second power state in response to the presence of the user; detecting, by executing an instruction with the at least one processor, a presence of an appendage of the user based on second sensor data generated by a second sensor of the computing device; instructing, by executing an instruction with the at least one processor, the touch controller to transition from the second power state to a third power state in response to detection of the appendage; and causing, by executing an instruction with the at least one processor, the computing device to exit a connected standby mode in response to a user input.

Example 25 includes the method as defined in example 24, further including activating the second sensor in response to detection of the user.

Example 26 includes the method as defined in example 24, further including deactivating the second sensor based on the second sensor data.

Example 27 includes the method as defined in examples 24 or 25, further including instructing the touch controller to move from the second power state to the third power state in response to detection of the appendage within a threshold time.

Example 28 includes the method as defined in any of examples 24-27, further including instructing the touch controller to move from the second power state to the first power state in response to the appendage not being detected within a threshold time.

Example 29 includes the method as defined in any of examples 24-28, wherein the third power state is a working device power state for the touch controller.

Example 30 includes the method as defined in example 24, further including causing the touch controller to move from the third power state to the first power state if the user input is not detected within a threshold time interval.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An electronic device comprising:
a touch screen;
a touch controller;
a first sensor;
a second sensor;
a user presence detection analyzer to analyze first sensor data generated by the first sensor to detect a presence of a subject proximate to the electronic device;
a user appendage detection analyzer to analyze second sensor data generated by the second sensor to detect a presence of an appendage;
a touch controller manager to cause the touch controller to (a) transition from a first power state to a second power state in response to the user presence detection analyzer detecting the presence of the subject and (b) transition from the second power state to a third power state in response to the user appendage detection analyzer detecting the presence of the appendage; and
a processor to power on the touch screen in response to a user input after the touch controller is in the third power state.

2. The electronic device as defined in claim 1, further including a user input analyzer to detect touch on the touch screen when the touch controller is in the third power state based on data generated by the touch controller.

3. The electronic device as defined in claim 2, wherein the touch controller manager is to instruct the touch controller to transition from the third power state to the first power state if the user input analyzer fails to detect the touch within a threshold time.

4. The electronic device as defined in claim 1, further including a sensor manager to selectively activate the second sensor based on the first sensor data.

5. The electronic device as defined in claim 4, wherein the sensor manager is to deactivate the second sensor if the user appendage detection analyzer does not detect the appendage within a threshold time.

6. The electronic device as defined in claim 1, wherein the touch controller is to instruct the touch controller to transition from the second power state to the third power state if the user appendage detection analyzer detects the presence of the appendage within a threshold time.

7. The electronic device as defined in claim 1, wherein the touch controller is to instruct the touch controller to transition from the second power state to the first power state if the user appendage detection analyzer fails to detect the presence of the appendage within a threshold time.

8. The electronic device as defined in claim 1, wherein the touch controller is to consume a greater amount of power in the second power state than in the first power state and the touch controller is to consume a greater amount of power in the third power state than in the first power state.

9. A non-transitory computer readable medium comprising instructions that, when executed, cause a computing device to at least:

detect a presence of a user proximate to the computing device based on first sensor data generated by a first sensor of the computing device;

instruct a touch controller of the computing device to transition from a first power state to a second power state in response to the presence of the user;

detect a presence of an appendage of the user based on second sensor data generated by a second sensor of the computing device;

instruct the touch controller to transition from the second power state to a third power state in response to the detection of the appendage; and cause the computing device to exit a connected standby mode in response to a user input.

10. The non-transitory computer readable medium as defined in claim 9, wherein the instructions, when executed, further cause the computing device to activate the second sensor in response to detection of the user.

11. The non-transitory computer readable medium as defined in claim 10, wherein the instructions, when executed, further cause the computing device to deactivate the second sensor based on the second sensor data.

12. The non-transitory computer readable medium as defined in claim 9, wherein the instructions, when executed, further cause the computing device to instruct the touch controller to move from the second power state to the third power state in response to detection of the appendage within a threshold time.

13. The non-transitory computer readable medium as defined in claim 9, wherein the instructions, when executed, further cause the computing device to instruct the touch controller to move from the second power state to the first power state in response to the appendage not being detected within a threshold time.

14. The non-transitory computer readable medium as defined in claim 9, wherein the third power state is a working device power state for the touch controller.

15. The non-transitory computer readable medium as defined in claim 9, wherein the instructions, when executed, further cause the touch controller to move from the third power state to the first power state if the user input is not detected within a threshold time interval.

16. A computing device comprising:

a display screen;

a first sensor to detect a presence of a user in an environment;

a second sensor to detect a presence of an appendage of the user; and at least one processor to:
cause a touch controller of the computing device to transition from a first power state to a second power state based on first data generated by the first sensor; and
cause the touch controller to transition from the second power state to a third power state based on second data generated by the second sensor.

17. The computing device of claim 16, wherein the first sensor is carried by a bezel of the display screen.

18. The computing device as defined in claim 16, further including a keyboard, wherein the second sensor is proximate to the keyboard.

19. The computing device as defined in claim 16, wherein the first sensor includes a first proximity sensor.

20. The computing device as defined in claim 19, wherein the second sensor includes a second proximity sensor.

21. The computing device as defined in claim 16, wherein the at least one processor is to disable the second sensor in response to the detection of a touch on the display screen.

22. The computing device as defined in claim 16, wherein the at least one processor is to cause a power state of the computing device to transition from a connected standby state to a working power state in response to a user input.

23. A method comprising:

detecting, by executing an instruction with at least one processor, a presence of a user proximate to a computing device based on first sensor data generated by a first sensor of the computing device;

instructing, by executing an instruction with the at least one processor, a touch controller of the computing device to transition from a first power state to a second power state in response to the presence of the user;

detecting, by executing an instruction with the at least one processor, a presence of an appendage of the user based on second sensor data generated by a second sensor of the computing device;

instructing, by executing an instruction with the at least one processor, the touch controller to transition from the second power state to a third power state in response to detection of the appendage; and causing, by executing an instruction with the at least one processor, the computing device to exit a connected standby mode in response to a user input.

24. The method as defined in claim 23, further including activating the second sensor in response to detection of the user.

25. The method as defined in claim 23, further including deactivating the second sensor based on the second sensor data.

26. The method as defined in claim 23, further including instructing the touch controller to move from the second power state to the third power state in response to detection of the appendage within a threshold time.

27. The method as defined in claim 23, further including instructing the touch controller to move from the second power state to the first power state in response to the appendage not being detected within a threshold time.

28. The method as defined in claim 23, wherein the third power state is a working device power state for the touch controller.

29. The method as defined in claim 23, further including causing the touch controller to move from the third power state to the first power state if the user input is not detected within a threshold time interval.

30. An apparatus comprising:
at least one memory;
machine-readable instructions; and
processor circuitry to execute the machine-readable instructions to:
  detect a presence of a user proximate to a computing device based on first sensor data generated by a first sensor of the computing device;
  instruct a touch controller of the computing device to transition from a first power state to a second power state in response to the presence of the user;
  detect a presence of an appendage of the user based on second sensor data generated by a second sensor of the computing device;
  instruct the touch controller to transition from the second power state to a third power state in response to the detection of the appendage; and
  cause the computing device to exit a connected standby mode in response to a user input.

31. The apparatus as defined in claim 30, wherein the processor circuitry is to cause the computing device to activate the second sensor in response to detection of the user.

32. The apparatus as defined in claim 31, wherein the processor circuitry is to cause the computing device to deactivate the second sensor based on the second sensor data.

33. The apparatus as defined in claim 30, wherein the processor circuitry is to cause the computing device to instruct the touch controller to move from the second power state to the third power state in response to detection of the appendage within a threshold time.

34. The apparatus as defined in claim 30, wherein the processor circuitry is to cause the computing device to instruct the touch controller to move from the second power state to the first power state in response to the appendage not being detected within a threshold time.

35. The apparatus as defined in claim 30, wherein the third power state is a working device power state for the touch controller.

36. The apparatus as defined in claim 30, wherein the processor circuitry is to cause the touch controller to move from the third power state to the first power state if the user input is not detected within a threshold time interval.

* * * * *